United States Patent
Nagai et al.

(10) Patent No.: US 6,974,907 B2
(45) Date of Patent: Dec. 13, 2005

(54) CABLE STRUCTURE

(75) Inventors: Shigekazu Nagai, Adachi-ku (JP); Toru Sugiyama, Abiko (JP); Masahiko Someya, Ryugasaki (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/793,785

(22) Filed: Mar. 8, 2004

(65) Prior Publication Data

US 2004/0177993 A1 Sep. 16, 2004

(30) Foreign Application Priority Data

Mar. 10, 2003 (JP) .................................. 2003-063754

(51) Int. Cl.[7] .................................................. H01B 7/34
(52) U.S. Cl. .................. 174/36; 174/117 R; 174/117 F; 174/117 FF; 248/51
(58) Field of Search ............................ 248/49, 51, 53, 248/60, 74.2, 78.1; 414/280; 174/36, 110 R, 113 R, 117 F, 117 FF

(56) References Cited

U.S. PATENT DOCUMENTS

| | | | |
|---|---|---|---|
| 1,928,423 A | | 9/1933 | Hansen |
| 4,746,766 A | * | 5/1988 | Soulard ........................ 174/36 |
| 4,898,351 A | * | 2/1990 | Suzuki ......................... 248/51 |
| 5,016,841 A | * | 5/1991 | Schumann et al. ............ 248/51 |
| 5,207,115 A | | 5/1993 | Takei |
| 5,460,059 A | | 10/1995 | Kato |
| 5,669,749 A | * | 9/1997 | Danielson et al. ........... 414/280 |
| 5,747,896 A | | 5/1998 | Nagai et al. |
| 5,764,839 A | * | 6/1998 | Igl et al. ...................... 385/114 |
| 6,166,332 A | * | 12/2000 | Farrow et al. ............... 174/135 |
| 6,194,664 B1 | * | 2/2001 | Zamora et al. ........... 174/117 F |
| 6,215,068 B1 | * | 4/2001 | Meier ......................... 174/68.1 |
| 6,323,428 B1 | * | 11/2001 | Takano .................... 174/117 F |
| 6,756,707 B2 | | 6/2004 | Hochhalter et al. |
| 2003/0168244 A1 | | 9/2003 | Nagai et al. .............. 174/117 F |
| 2003/0172755 A1 | | 9/2003 | Nagai et al. ................. 74/89.2 |
| 2003/0217610 A1 | | 11/2003 | Nagai et al. ................. 74/89.2 |

FOREIGN PATENT DOCUMENTS

| | | |
|---|---|---|
| DE | 26 27 528 A1 | 12/1977 |
| EP | 0 918 174 | 5/1999 |
| JP | 2002-176274 | 6/2002 |
| KR | 0096906 | 11/1995 |

OTHER PUBLICATIONS

Schneeberger Linear Technology Automation, "Linear–und Rotationsmodule," Nov. 26, 2001, p. 4.
Europa–Lehrmittel, "Der Werkzeugbau," Verlag Willing & Co., Wuppertal Barmen, 2. Auflage, 1959, pp. 102–107.

* cited by examiner

*Primary Examiner*—William H. Mayo, III
(74) *Attorney, Agent, or Firm*—Paul A. Guss

(57) ABSTRACT

A cable includes a plurality of tubes formed integrally and continuously in the vertical direction. The cable has one end fixed to a first cable-connecting section disposed at one end of a body of an electric actuator. The cable has the other end connected to a second cable-connecting section connected to a slider which is displaceable along the axis by a rotary driving source. The cable is installed substantially horizontally with respect to the body. The dimension in height is large, and the dimension in thickness is small.

13 Claims, 22 Drawing Sheets

CABLE STRUCTURE

BACKGROUND OF THE INVENTION

1. Field of the Invention

The present invention relates to a cable structure to be connected between a fixed member such as an actuator body and a displaceable member such as a slider.

2. Description of the Related Art

Conventionally, as shown in FIG. 23, for example, a slider 2 is displaceable on a first actuator 1 in a substantially horizontal direction. A second actuator 3 as a separate body is integrally connected to the slider 2. A plurality of cables 4, which include, for example, a lead wire for feeding an electric signal and a tube for introducing a pressure fluid, have first ends which are connected to an upper portion of a second actuator body 3a of the second actuator 3. Second ends of the cables 4 are connected to an upper portion of a first actuator body 1a.

The plurality of cables 4 are arranged in a cable guide mechanism 5 which is composed of a resin material. The cables 4 are flexed integrally when the cable guide mechanism 5 is flexed.

In the cable guide mechanism 5, a plurality of brackets 6, which are made of a resin material, are connected rotatably and continuously to one another by pins 7. The cable guide mechanism 5 is connected to the upper portion of the first actuator body 1a and the upper portion of the second actuator body 3a. The cable guide mechanism 5 is provided to extend flexibly in only the axial direction of the first actuator body 1a.

The cable guide mechanism 5 includes certain clearances, for example, at joined portions between the adjoining brackets 6 and between the pins 7 and the brackets 6 so that the cable guide mechanism 5 is capable of being smoothly flexed in the state in which the plurality of cables 4 are arranged.

However, for example, when the conventional cables 4 are applied to an actuator which is arranged substantially horizontally, or when the space in a substantially vertical direction (height direction) of an actuator is restricted, then the brackets 6, the pins 7, and other components are undesirably displaced from their original attachment positions by the gravity due to the clearances provided for the cable guide mechanism 5, if the cables 4 are connected by the cable guide mechanism 5. That is, the cable guide mechanism 5 is bent downwardly approximately about the center between the fixed member and the displaceable member of the actuator.

Therefore, when the cables 4 are adopted for the actuator which is arranged substantially horizontally, it is necessary to secure some space vertically considering the bending amounts of the cables 4 arranged in the cable guide mechanism 5.

As a result, when installation space for the actuator is restricted vertically, the cable guide mechanism 5 may be abraded by the contact, for example, with the floor surface and another apparatus provided under the actuator. Therefore, the durability of the cables 4 is decreased due to the abrasion, and the resistance against displacement arises when the actuator is displaced along the axis by the contact of the cables 4.

SUMMARY OF THE INVENTION

A general object of the present invention is to provide a cable structure which makes it possible to retain a belt member in a substantially horizontal state with respect to an actuator body when the installation space for an actuator is restricted vertically.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
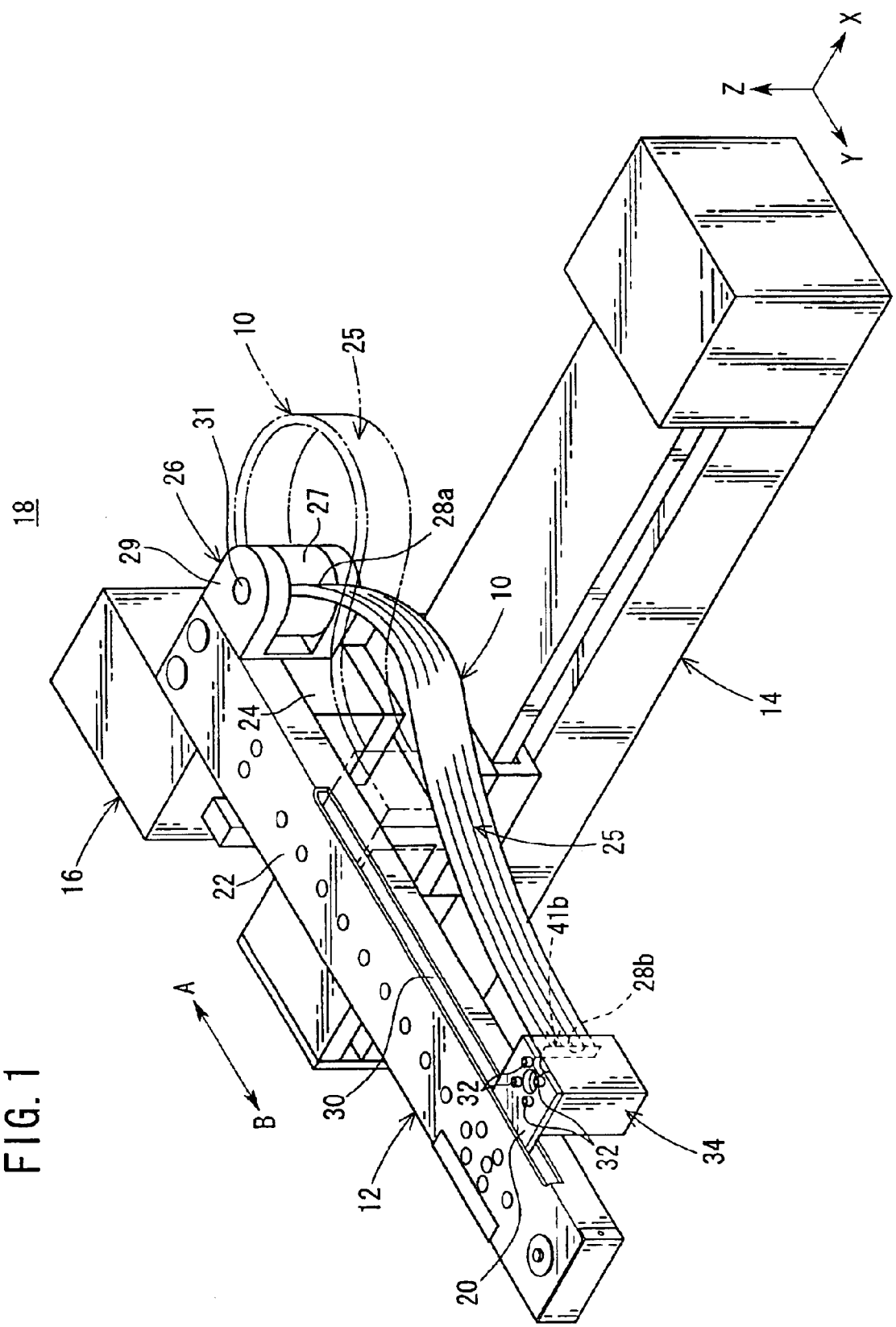
FIG. 1 is a perspective view illustrating an electric actuator to which a cable according to a first embodiment of the present invention is applied.

FIG. 1 is a perspective view illustrating an electric actuator 12 to which a cable 10 according to a first embodiment of the present invention is applied. The electric actuator 12 is assembled to a three-axis displacement apparatus 18 comprising three electric actuators 12, 14, 16 in combination, and the electric actuator 12 has a slider (displaceable member) 20 which is displaceable in the Y axis direction.

The electric actuator 12 is displaceable in the direction of the arrow X under the displacement of the electric actuator 14 provided with a slider which is displaceable in the X axis direction, and the electric actuator 12 is displaceable in the direction of the arrow Z by the electric actuator 16 provided with a slider which is displaceable in the Z axis direction.

The electric actuator 12 comprises a body (actuator body) 22 which has an elongate shape, a rotary driving source 24 which is integrally connected to a lower portion of one end of the body 22, an unillustrated first pulley member which is integrally connected to a drive shaft of the rotary driving source 24, and an unillustrated second pulley member which is rotatably supported on the other end of the body 22.

The electric actuator 12 further comprises an unillustrated timing belt running over the pair of first and second pulley members respectively, the slider 20 which is displaceable in the axial direction (directions of the arrow A and B) under the rotation of the timing belt, and a band-shaped belt member 25 which has one end connected to one end of the fixed body 22 and which has the other end connected to the movable slider 20. The slider 20 is connected to the timing belt in an integrated manner.

A first cable-connecting section (fixed end) 26, which protrudes by a predetermined length, is provided at one end of the body 22.

The first cable-connecting section 26 includes a holding member 29 which has a U-shaped cross section and which is fixed to one end of the body 22, a rotary shaft 31 which has both ends rotatably attached to the holding member 29, and a rotatable member 27 which is rotatably supported by the rotary shaft 31.

An insertion hole 28a, which is provided substantially in parallel to the rotary shaft 31 and which is recessed by a predetermined depth, is formed on the outer circumferential surface of the rotatable member 27. One end of the belt member 25 is inserted into the insertion hole 28a, and it is integrally fixed by an unillustrated fixing means disposed in the rotatable member 27. The insertion hole 28a is formed so that the height thereof is substantially the same as or slightly larger than the height of the belt member 25. The rotary driving source 24 is integrally connected to a lower portion at one end of the body 22 by unillustrated screw members. The rotary driving source 24 is driven by an unillustrated power source, and its rotary driving force is transmitted to the unillustrated first pulley member which is arranged in the body 22.

The slider 20 is provided such that a part of the slider 20 protrudes outwardly from an opening 30 which is formed through the side surface of the body 22. A second cable-connecting section (movable end) 34 is connected by screw members 32 to the lower surface of the slider 20 protruding to the outside. An insertion hole 28b, into which the other end of the belt member 25 is inserted, is formed on the side surface of the second cable-connecting section 34 near the body 22.

Figure 3:
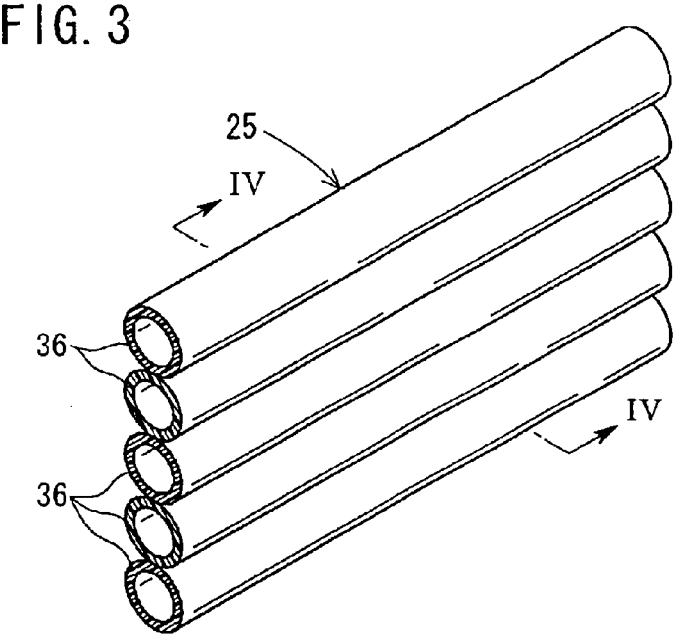
FIG. 3 is, with partial cross section, a perspective view illustrating a belt member of the cable shown in FIG. 1.
Figure 4:
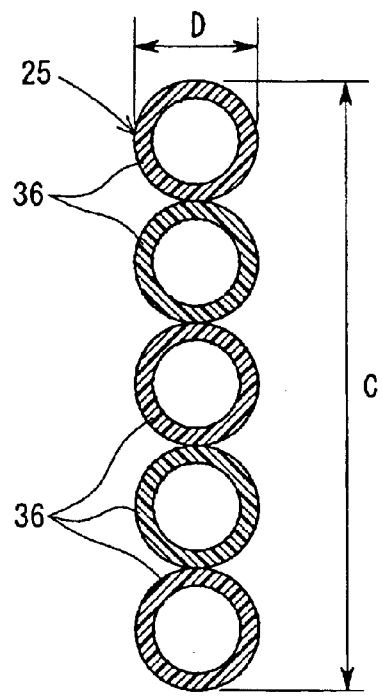
FIG. 4 is a vertical sectional view taken along a line IV—IV shown in FIG. 3.

As shown in FIGS. 3 and 4, the belt member 25 is made of a resin material so that the belt member 25 is flexible. The height dimension C is large, and the thickness dimension D is small. That is, the belt member 25 is formed such that the dimension C is larger than the dimension D (C>D).

That is, the belt member 25 is plate-shaped, in which the belt member 25 is wide in the height direction and the belt member 25 is thin in the thickness direction. Accordingly, it is possible to increase the rigidity of the cable 10 in the height direction. Therefore, it is possible to prevent the bending of the cable 10 in the direction of the gravity caused by the own weight of the cable 10. Further, when the belt member 25 is plate-shaped, it is possible to improve the flexibility of the belt member 25 more appropriately.

The belt member 25 includes tubes 36 into each of which an unillustrated lead wire for feeding an electric signal is inserted or through each of which a pressure fluid such as air is supplied. The tubes 36 are arranged continuously in a band-shaped form in which the tubes 36 are disposed in parallel in the height direction respectively. To arrange the plurality of tubes 36 continuously in parallel, the outer circumferential surfaces of the tubes 36, on which the tubes 36 make mutual abutment, may be bonded or welded to one another. Alternatively, the entire belt member 25, in which the plurality of tubes 36 are juxtaposed, may be integrally molded.

When the tubes 36 are joined in parallel in the height direction, the dimension C (see FIG. 4) of the belt member 25 can be large. Therefore, it is possible to secure the large rigidity of the belt member 25 in the height direction, and it is possible to prevent the bending of the cable 10 in the direction of the gravity.

As shown in FIG. 1, one end of the belt member 25 is inserted by a predetermined length into the insertion hole 28a of the first cable-connecting section 26 which is fixed to one end of the body 22. The one end of the belt member 25 is integrally connected by an unillustrated fixing mechanism.

The second cable-connecting section 34 is integrally connected to the lower portion of the slider 20, and has the insertion hole 28b which is formed substantially in parallel to the side surface of the body 22. The other end of the belt member 25 is inserted by a predetermined length into the insertion hole 28b. The other end of the belt member 25 is integrally connected by an unillustrated fixing mechanism. Accordingly, the belt member 25 is connected substantially in parallel in the axial direction of the body 22 in a curved form between the first cable-connecting section 26 and the second cable-connecting section 34. In other words, the belt member 25 is installed so that the plane perpendicular to the axis of the belt member 25 is substantially parallel to a vertical plane.

The length of the belt member 25 is designed such that the belt member 25 fixed to the first cable-connecting section 26 has some amount of margin when the slider 20 is maximally displaced up to the other end side of the body 22 disposed on the end opposite to the rotary driving source 24, i.e., when the first cable-connecting section 26 is farthest from the second cable-connecting section 34.

Accordingly, when the slider 20 is displaced to the other end of the body 22 where the slider 20 is the farthest from the first cable-connecting section 26, the slider 20 is prevented from undergoing some resistance which would be otherwise caused when the slider 20 is displaced, because of the margin provided for the belt member 25.

The electric actuator 12, to which the cable 10 according to the first embodiment of the present invention is applied, is basically constructed as described above. Next, its operation, function, and effect will be explained.

The rotary driving source 24 is energized by using the unillustrated power source. When the rotary driving source 24 is rotated, the unillustrated first pulley member, which is provided on one end side of the body 22, is rotated by the unillustrated drive shaft.

The unillustrated second pulley member is integrally rotated under the rotary action of the first pulley member by the timing belt. As a result, the slider 20, which is integrally connected to the unillustrated timing belt, is displaced in the axial direction of the body 22 (directions of the arrow A and B).

In this arrangement, the other end of the belt member 25 is integrally installed to the slider 20 by the second cable-connecting section 34. Therefore, the other end of the belt member 25 is displaced and follows the slider 20. As a result, the belt member 25 of the resin material is flexed substantially along a horizontal plane between the first cable-connecting section 26 to which one end of the belt member 25 is installed and the slider 20 to which the other end is installed. That is, the belt member 25 is provided so that the axis of the belt member 25 is flexible substantially on the horizontal plane when the slider 20 and the second cable-connecting section 34 are displaced integrally. The belt member 25 is formed such that the belt member 25 is large in the height direction and the belt member 25 is small in the thickness direction. Therefore, the bending of the belt member 25 is prevented in the direction of the gravity.

Figure 2:
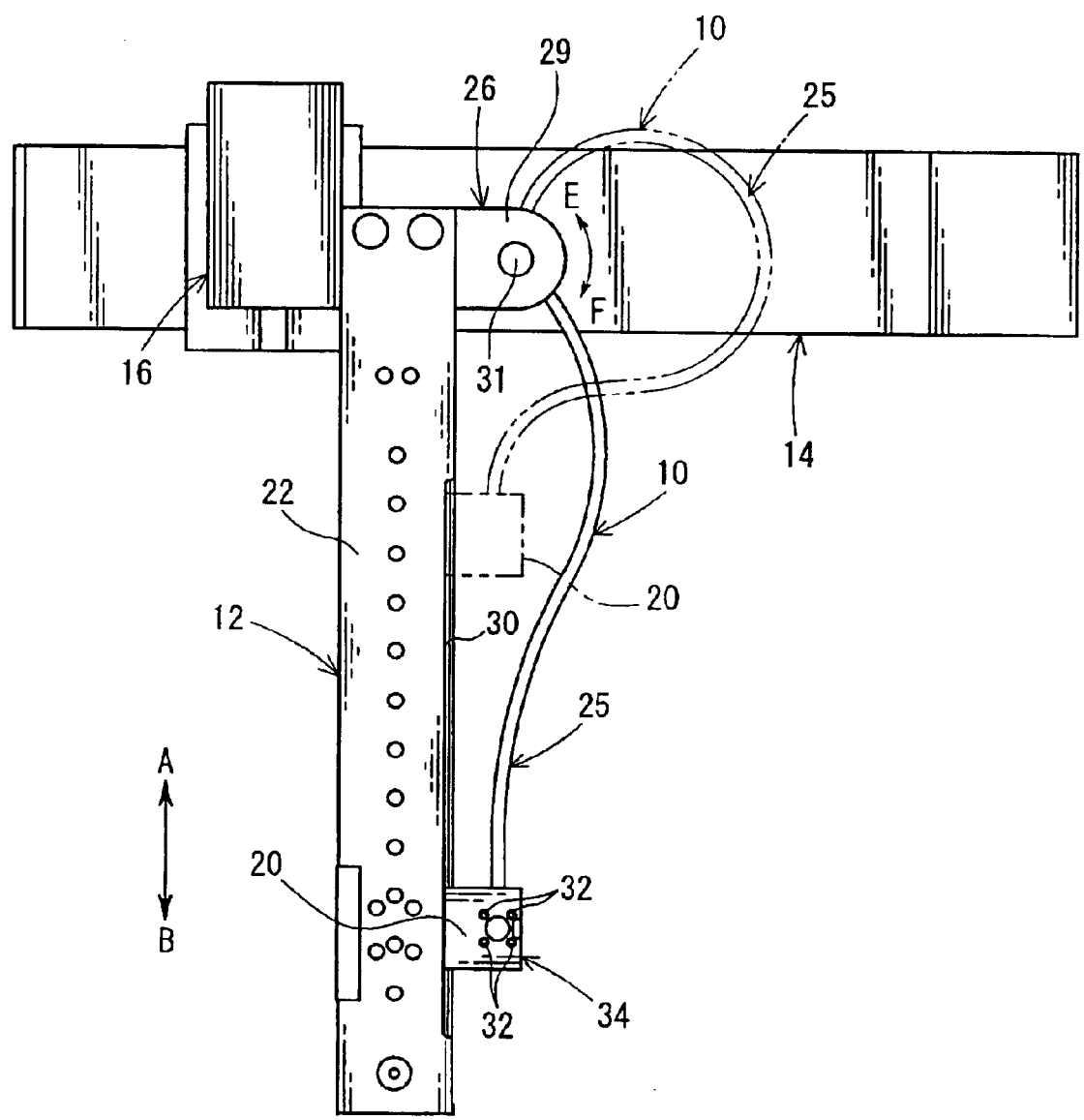
FIG. 2 is a plan view illustrating the electric actuator shown in FIG. 1.

The one end of the belt member 25 is installed to the first cable-connecting section 26 via the rotatable member 27. Therefore, when the belt member 25 is flexed under the displacement action of the slider 20 in the axial direction, the rotatable member 27 is freely rotated depending on the bending of the belt member 25. In particular, as shown in FIG. 2, when the slider 20 is displaced in the direction (direction of the arrow A) to approach the first cable-connecting section 26, the rotatable member 27, to which the one end of the belt member 25 is installed, is rotated counterclockwise (direction of the arrow E). On the other hand, when the slider 20 is displaced in the direction (direction of the arrow B) to separate from the first cable-connecting section 26 reversely to the above, the rotatable member 27 is rotated clockwise (direction of the arrow F).

As described above, in the first embodiment, the belt member 25 is provided between the body 22 and the slider 20 by the first and second cable-connecting sections 26, 34. The belt member 25 is flexed between the first cable-connecting section 26 and the second cable-connecting section 34 by the displacement of the slider 20 in the axial direction. In this arrangement, the one end of the belt member 25 is installed to the rotatable member 27 which is rotatably supported by the first cable-connecting section 26. Therefore, when the belt member 25 is flexed by the displacement of the slider 20 in the axial direction, the rotatable member 27 is rotated in accordance therewith. Accordingly, it is possible to reduce the bending of the belt member 25.

Therefore, the tension applied to the belt member 25 when curved is reduced. Accordingly, it is possible to improve the durability of the belt member 25. Further, the belt member 25 can be formed of a material having high rigidity, because the bending of the belt member 25 is decreased.

Figure 5:
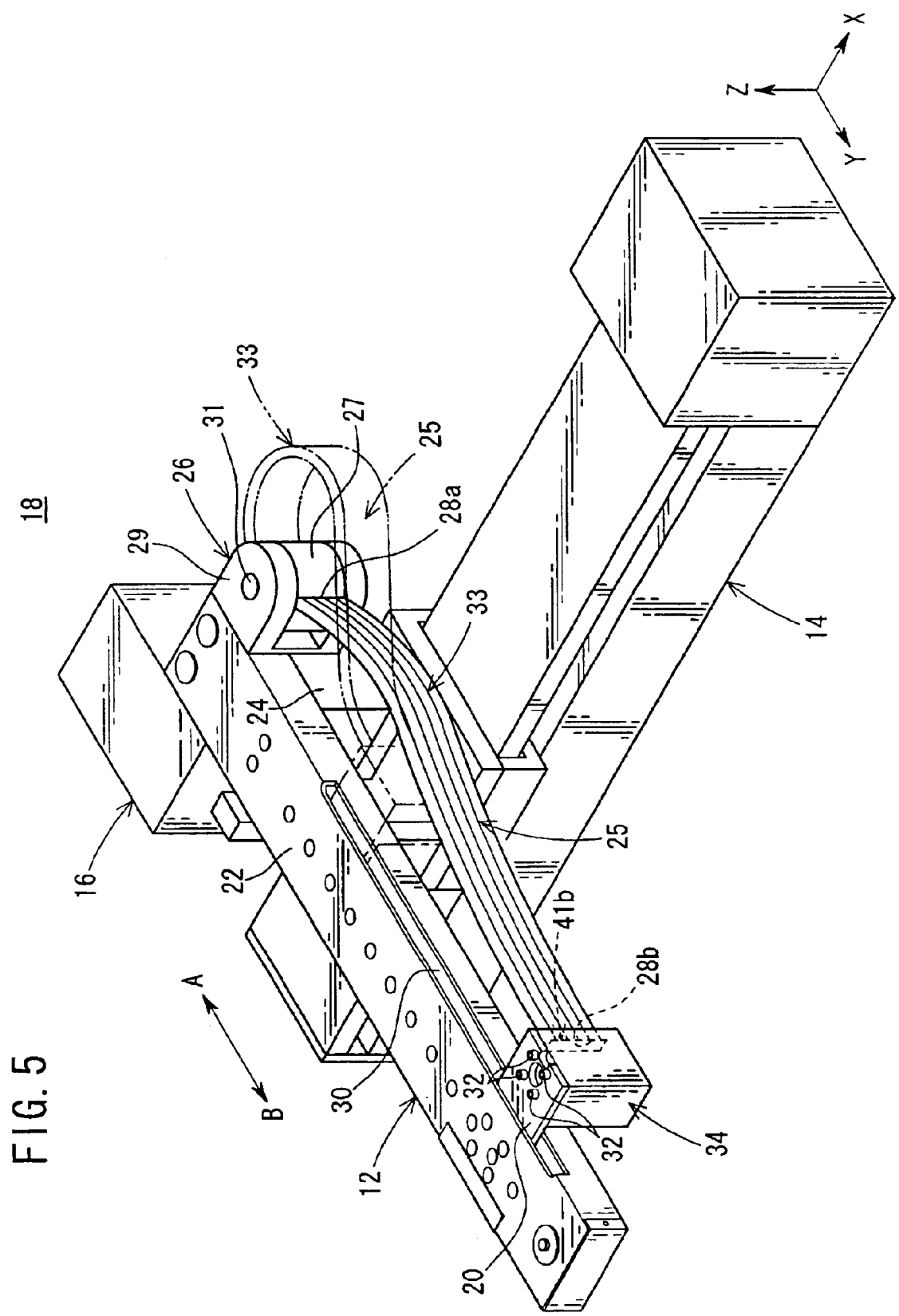
FIG. 5 is a perspective view illustrating the electric actuator wherein the cable, which is applied to the electric actuator shown in FIG. 1 is shortened in length.
Figure 6:
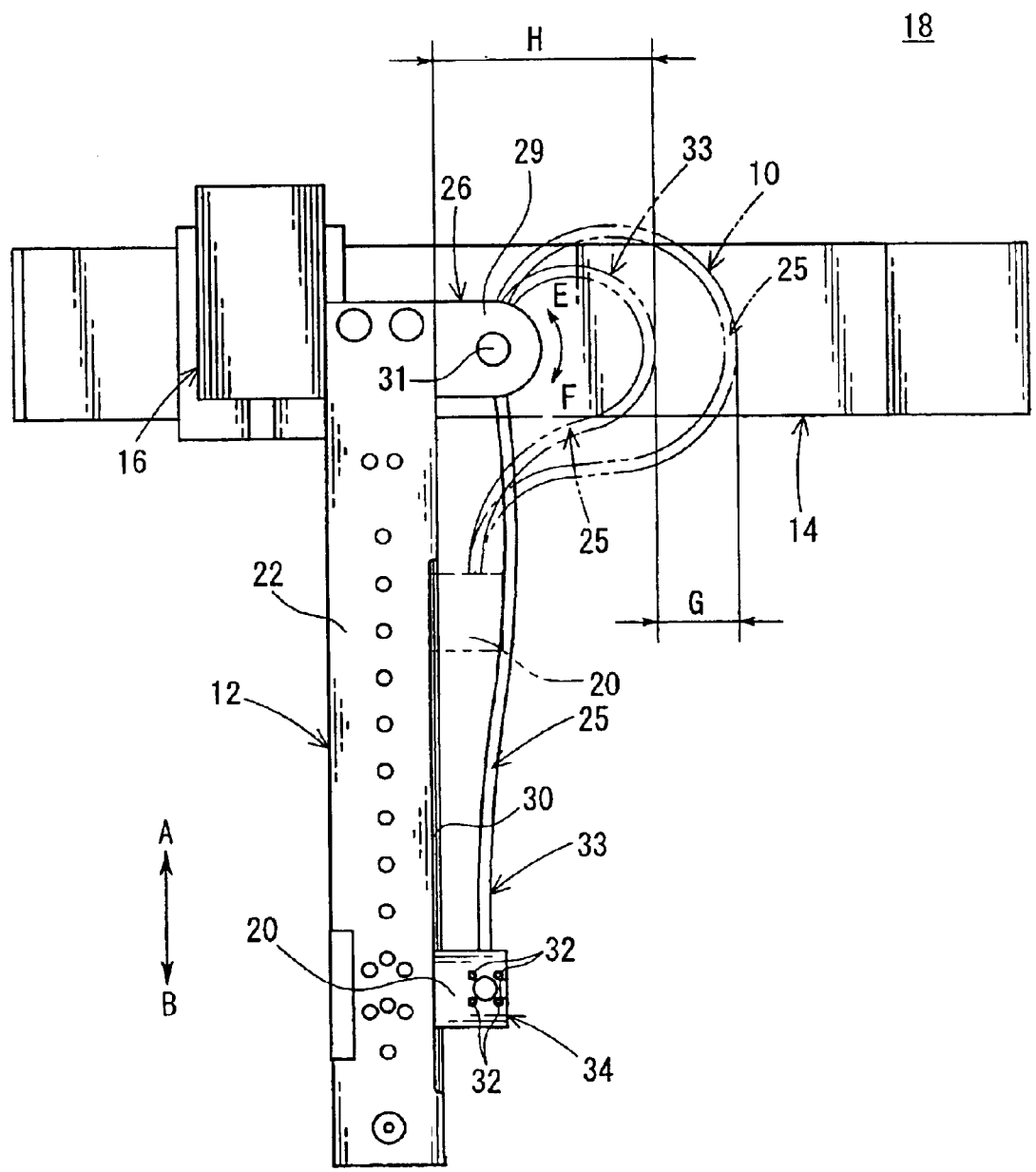
FIG. 6 is a plan view illustrating the electric actuator shown in FIG. 5.

As shown in FIGS. 5 and 6, another cable 33, in which the length in the axial direction is shortened by a predetermined length as compared with the cable 10, may be applied to the electric actuator 12. Accordingly, when the slider 20 is displaced in the direction (direction of the arrow A) to approach the first cable-connecting section 26, the intermediate portion of the belt member 25 disposed between the body 22 and the slider 20 approaches the body 22 more closely (see the dimension G in FIG. 6) as compared with the cable 10 according to the first embodiment shown in FIGS. 1 and 2.

Therefore, it is possible to decrease the distance of separation H of the cable 33 including the intermediate portion of the belt member 25 from the body 22. It is possible to reduce the amount of protrusion of the belt member 25 from the side surface of the body 22, i.e., the dimension H (widthwise) projecting from the side surface of the electric actuator 12, as compared with the cable 10.

As a result, as for the cable 33, it is possible to improve the durability of the belt member 25 by reducing the tension applied when the belt member 25 is curved. Additionally, it is possible to reduce the amount of projection of the belt member 25 from the side surface of the body 22. Thus, it is possible to appropriately use the cable 33 even when the installation space is restricted widthwise.

Further, it is possible to reduce the bending of the cable 33 caused by the own weight of the cable 33, because the cable 33 is short as compared with the cable 10.

Figure 7:
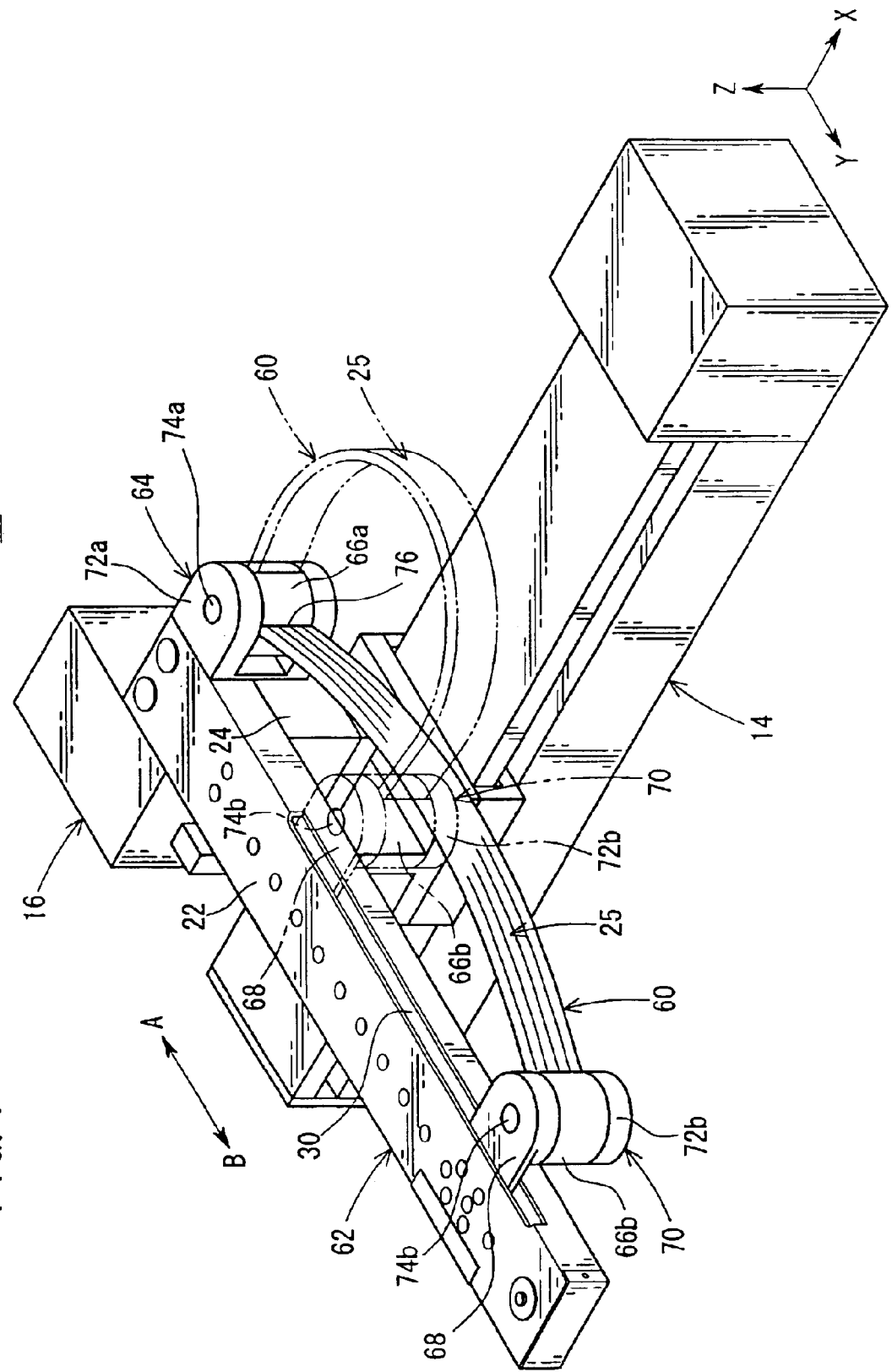
FIG. 7 is a perspective view illustrating an electric actuator to which a cable according to a second embodiment of the present invention is applied.

Next, an electric actuator 62, to which a cable 60 according to a second embodiment is applied, is shown in FIG. 7. In the second to sixth embodiments shown below, the constituent elements that are the same as those of the cable 10 according to the first embodiment described above are designated by the same reference numerals, and detailed explanation thereof will be omitted.

In the cable 60 according to the second embodiment, a rotatable member 66a is provided for a first cable-connecting section 64 that is fixed to one end of the body 22. One end of the belt member 25 is installed to the rotatable member 66a. Similarly, a rotatable member 66b is also provided for a second cable-connecting section 70 that is provided at a lower portion of the slider 68 integrally. The other end of the belt member 25 is installed to the rotatable member 66b.

As shown in FIG. 7, the first cable-connecting section 64 comprises a holding member 72a which has a U-shaped cross section and which is fixed to one end of the body 22, a rotary shaft 74a which has both ends rotatably attached to the holding member 72a, and the rotatable member 66a which is rotatably supported by the rotary shaft 74a.

The second cable-connecting section 70 has the cylindrical rotatable member 66b which is arranged on the lower surface of the slider 68 that protrudes from the opening 30 of the body 22. The rotatable member 66b is held by a disk-shaped holding member 72b. The rotatable member 66b is provided rotatably by a rotary shaft 74b which is supported by the slider 68 and the holding member 72b.

Insertion holes 76, which are provided substantially in parallel to the rotary shafts 74a, 74b respectively and each of which is recessed by a predetermined depth, are formed on the outer circumferential surfaces of the rotatable members 66a, 66b, respectively. One and the other ends of the belt member 25 are inserted into the insertion holes 76, and are integrally fixed by unillustrated fixing means disposed in the rotatable members 66a, 66b.

In this structure, one and the other ends of the belt member 25 are held by the rotatable members 66a, 66b. Therefore, when the belt member 25 is flexed by the displacement of the slider 68 in the axial direction, the rotatable members 66a, 66b, to which one and the other ends of the belt member 25 are fixed, are rotated respectively depending on the bending of the belt member 25. Accordingly, it is possible to appropriately reduce the bending of the belt member 25 as compared with a case in which one and the other ends of the belt member 25 are fixed to the first and second cable-connecting sections 64, 70.

As a result, it is possible to reduce the tension which is applied when the belt member 25 is curved, and it is possible to improve the durability of the belt member 25. Further, the belt member 25 can be formed of a material having high rigidity, because the bending of the belt member 25 is decreased.

Figure 8:
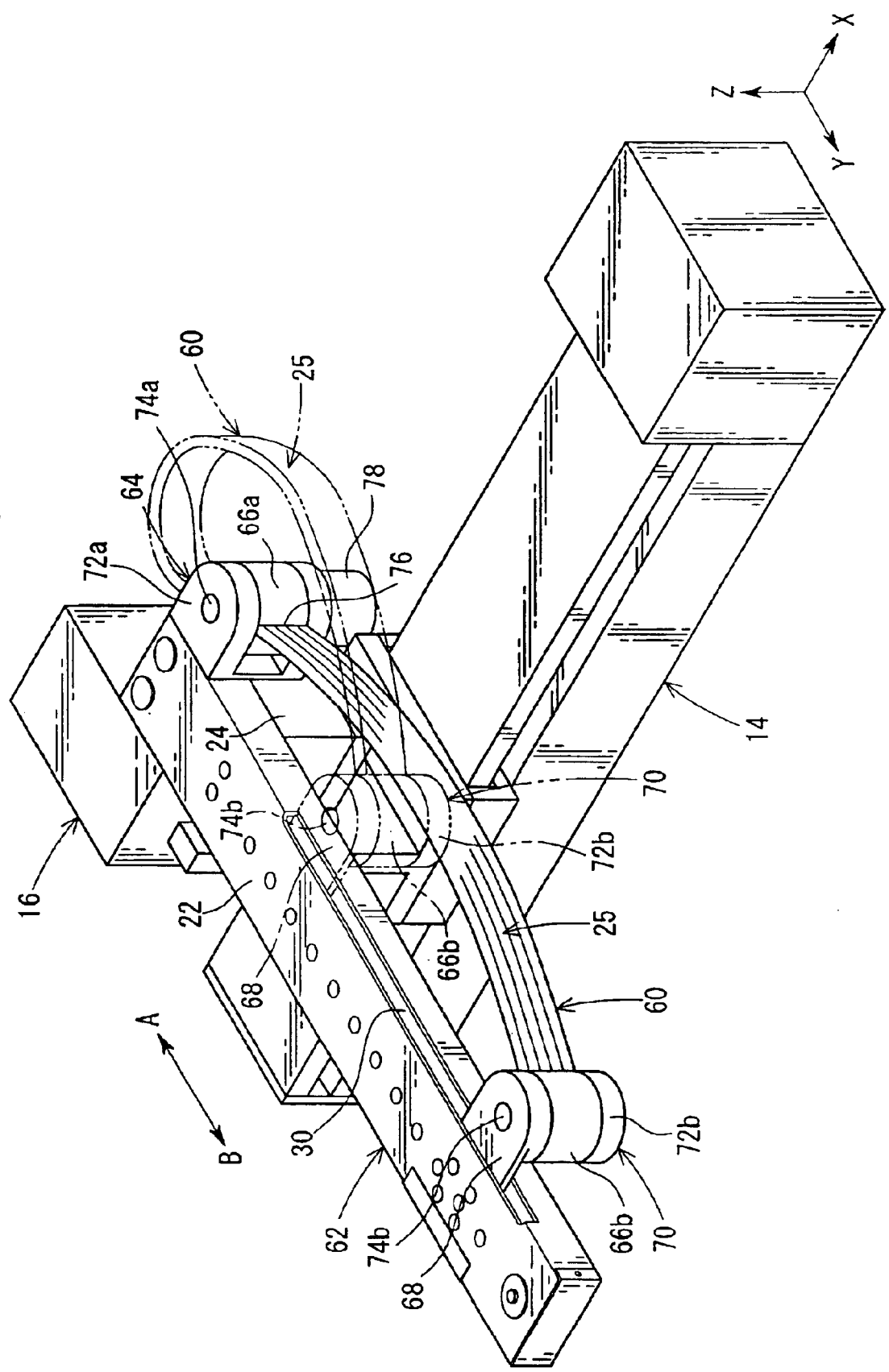
FIG. 8 is a perspective view in which a driving source for driving and rotating a rotatable member is installed to a first cable-connecting section of the electric actuator shown in FIG. 7.

On the other hand, as shown in FIG. 8, a cylindrical driving source 78 (for example, a stepping motor) may be provided under the first cable-connecting section 64. The rotary shaft 74a may be driven and rotated by the driving source 78, and the rotary shaft 74a and the rotatable member 66a may be connected to one another integrally. Accordingly, the rotatable member 66a can be rotated by the rotary shaft 74a when the driving source 78 is driven.

Therefore, when a control signal supplied from an unillustrated controller etc. is inputted into the driving source 78, it is possible to appropriately control the amount of rotation or the angle of rotation of the rotatable member 66a. As a result, it is possible to wind the belt member 25 by controlling the angle of rotation or the like of the rotatable member 66a and rotating the rotatable member 66a on the basis of the displacement amount of the slider 68 in the axial direction (directions of the arrow A and B). As a result, it is possible to arbitrarily control the bending of the belt member 25 held by the rotatable member 66a when the slider 68 is displaced in the axial direction as well as the projecting amount of the belt member 25 from the plane including the side surface of the body 22. Thus, the electric actuator 62, to which the cable 60 is applied, can be appropriately used in conformity with the installation space.

The foregoing explanation has been made for the case in which the driving source 78 such as the stepping motor is provided for the first cable-connecting section 64 to drive and rotate the rotatable member 66a. However, there is no limitation thereto. A spring urging the rotatable member 66a in the rotating direction may be provided in the rotatable member 66a in place of the driving source 78, and the belt member 25 may be wound by rotating the rotatable member 66a by the repulsive force of the spring.

Figure 9:
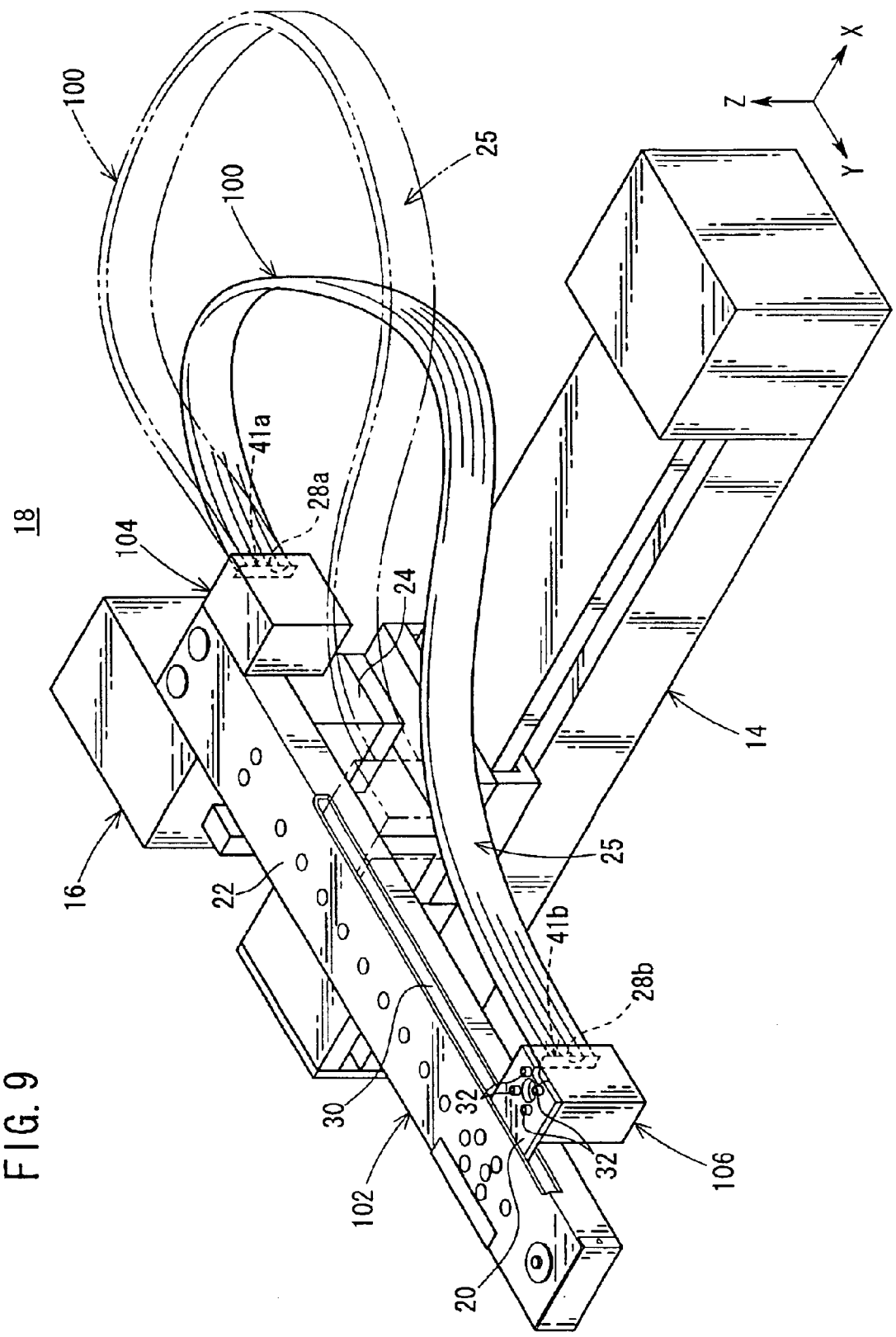
FIG. 9 is a perspective view illustrating an electric actuator to which a cable according to a third embodiment of the present invention is applied.
Figure 10:
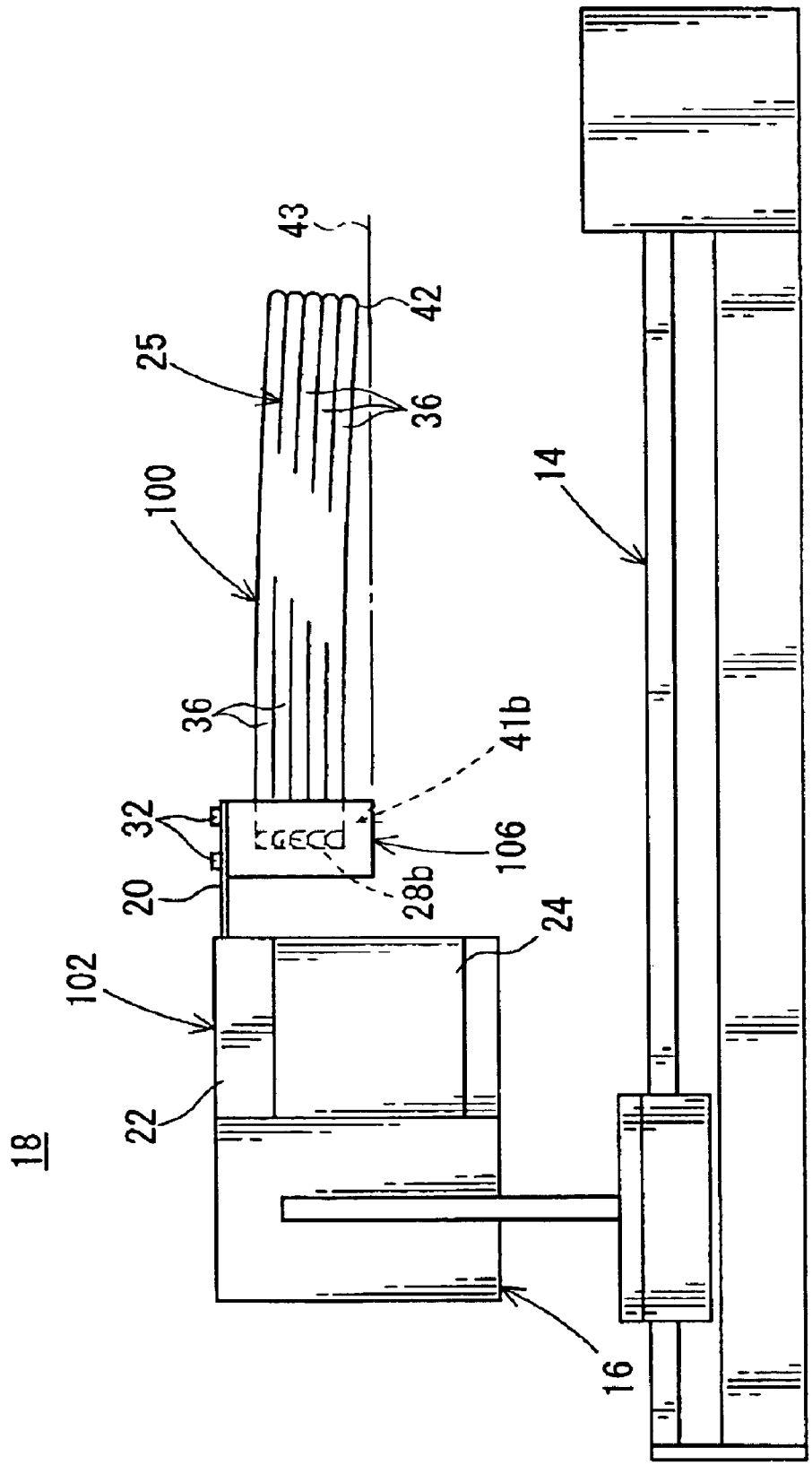
FIG. 10 is, with partial omission, a side view illustrating the electric actuator shown in FIG. 9.

Next, an electric actuator 102, to which a cable 100 according to a third embodiment is applied, is shown in FIGS. 9 and 10.

As shown in FIGS. 9 and 10, the cable 100 according to the third embodiment is provided with a first cable-connecting section 104 which has a substantially rectangular cross section and which is provided on one end of the body 22. One end of the belt member 25 is inserted by a predetermined length into an insertion hole 28a which is formed to be substantially in parallel to the side surface of the body 22 on the first cable-connecting section 104. The one end of the belt member 25 is integrally fixed by an unillustrated fixing mechanism.

Similarly, a second cable-connecting section 106, which has a substantially rectangular cross section, is provided on the lower surface of the slider 20. The other end of the belt member 25 is inserted by a predetermined length into an insertion hole 28b which is formed substantially in parallel to the side surface of the body 22 on the second cable-connecting section 106. The other end of the belt member 25 is integrally fixed by an unillustrated fixing mechanism.

Figure 11:
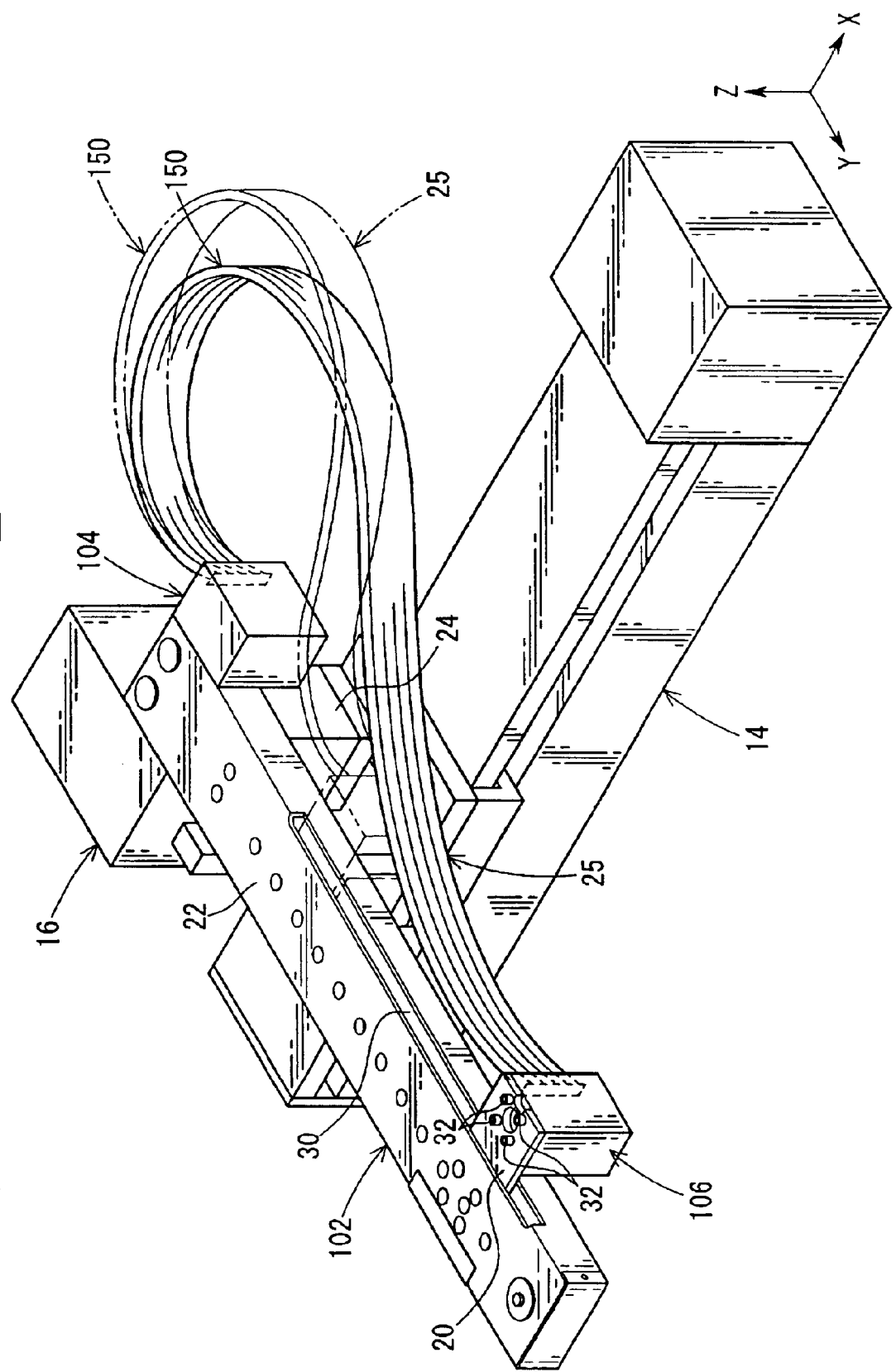
FIG. 11 is a perspective view illustrating the electric actuator in which the cable is fixed to first and second cable-connecting sections while being inclined toward a body in the electric actuator shown in FIG. 9.
Figure 12:
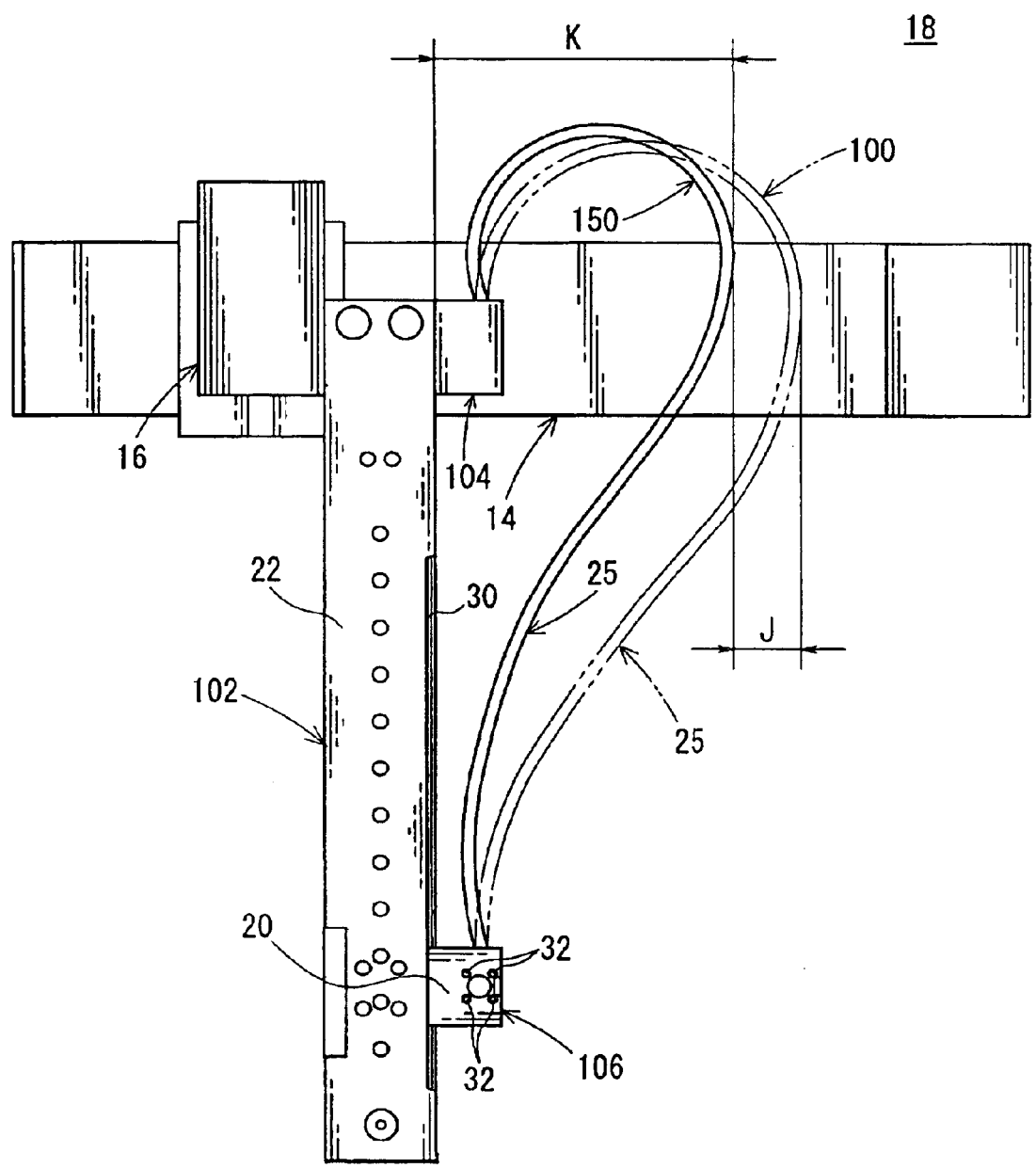
FIG. 12 is a plan view illustrating the electric actuator to which the cable shown in FIG. 11 is applied.
Figure 13:
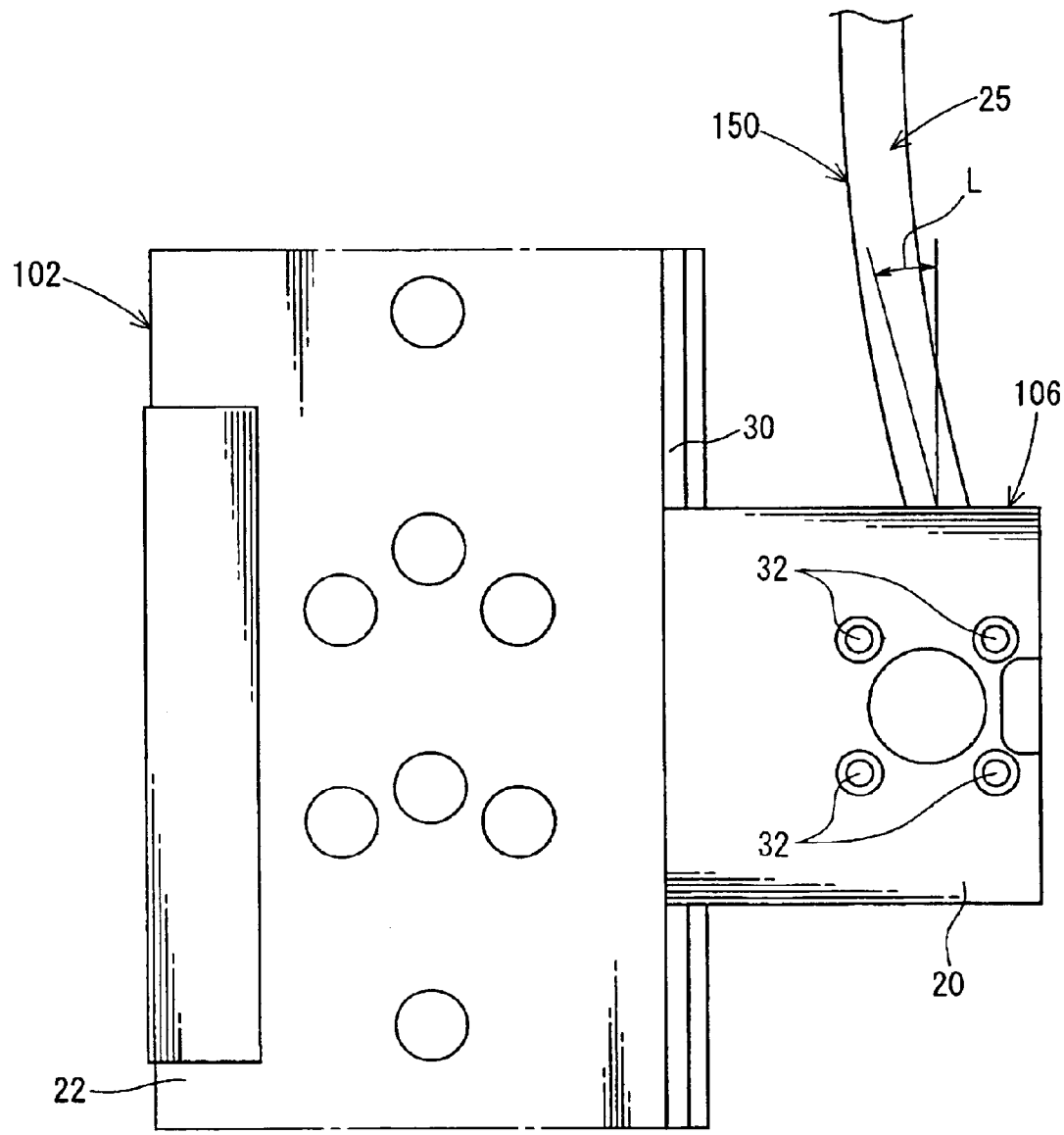
FIG. 13 is a partial magnified view illustrating elements disposed in the vicinity of the second cable-connecting section and a slider, which depicts an angle of attachment L of the cable shown in FIG. 11.

As shown in FIGS. 11 and 12, the both ends of the belt member 25, which are attached to the first and second cable-connecting sections 104, 106, may be attached so that each of them is inclined by a predetermined angle L (see FIG. 13) toward the body 22 on a substantially horizontal plane as compared with a state in which each of them is substantially in parallel to the side surface of the body 22 to which the first cable-connecting section 104 is connected. Accordingly, the intermediate portion of a cable 150, which is disposed between the body 22 and the slider 20, is closer to the body 22 (see the dimension J in FIG. 12) as compared with the cable 100 shown in FIGS. 9 and 10.

Therefore, it is possible to decrease the distance K (see FIG. 12) between the body 22 and the intermediate portion of the belt member 25 of the cable 150. It is possible to reduce the amount of protrusion of the belt member 25 from the side surface of the body 22, i.e., the dimension in the widthwise direction projecting from the side surface of the electric actuator 102, as compared with the cable 100 shown in FIGS. 9 and 10.

As a result, it is possible to reduce the projecting amount of the belt member 25 from the side surface of the body 22, and it is possible to appropriately use the electric actuator 102 even when the installation space is restricted widthwise.

As for the belt member 25, there is no limitation to the case in which both ends are attached to the first and second cable-connecting sections 104, 106 so that each of them is inclined toward the body 22 on the substantially horizontal plane as compared with the state in which each of them is substantially in parallel to the side surface of the body 22 to which the first cable-connecting section 104 is connected. Alternatively, only any one of the ends of the belt member 25 may be attached while being inclined toward the body 22, and the other end of the belt member 25 may be attached so that it is substantially in parallel to the axis of the body 22.

On the other hand, for example, when a belt member 25a, which is longer than the belt member 25 (see FIG. 9) by a predetermined length, is attached to the body 22 and the slider 20 so that the belt member 25a is substantially horizontal, then the rigidity is insufficient in vertical direction, and the bending amount of a cable 170 including the belt member 25a is increased in the direction of the gravity, because the belt member 25a is long. As a result, the lower end 42 of the bending of the cable 170 in the direction of the gravity may protrude downwardly from the lower surface 43 of the first cable-connecting section 104 and the second cable-connecting section 106 (in the form indicated by two-dot chain lines in FIG. 14).

Figure 14:
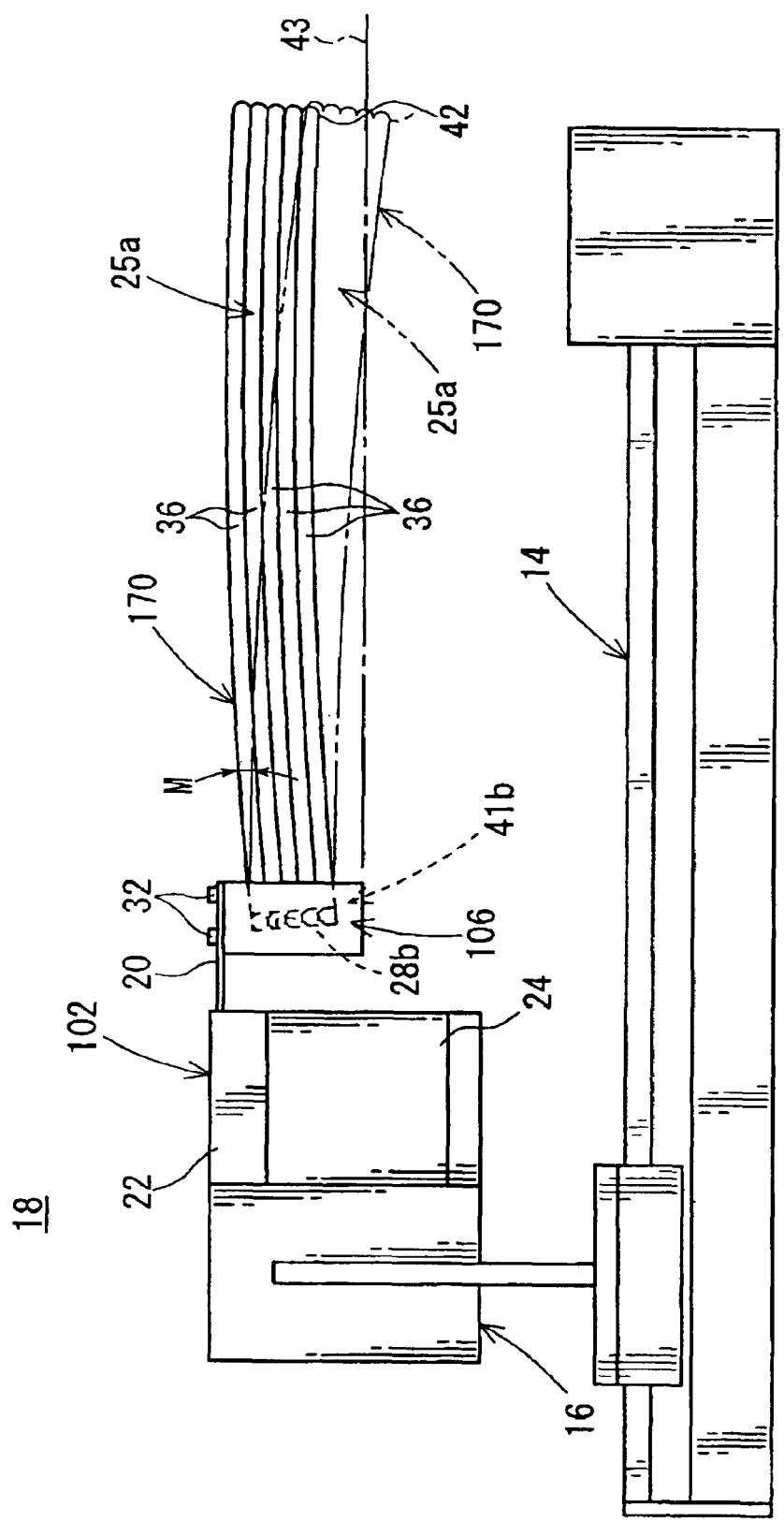
FIG. 14 is, with partial omission, a side view in which the cable shown in FIG. 10 is fixed while being inclined upwardly by an angle of attachment M.
Figure 15:
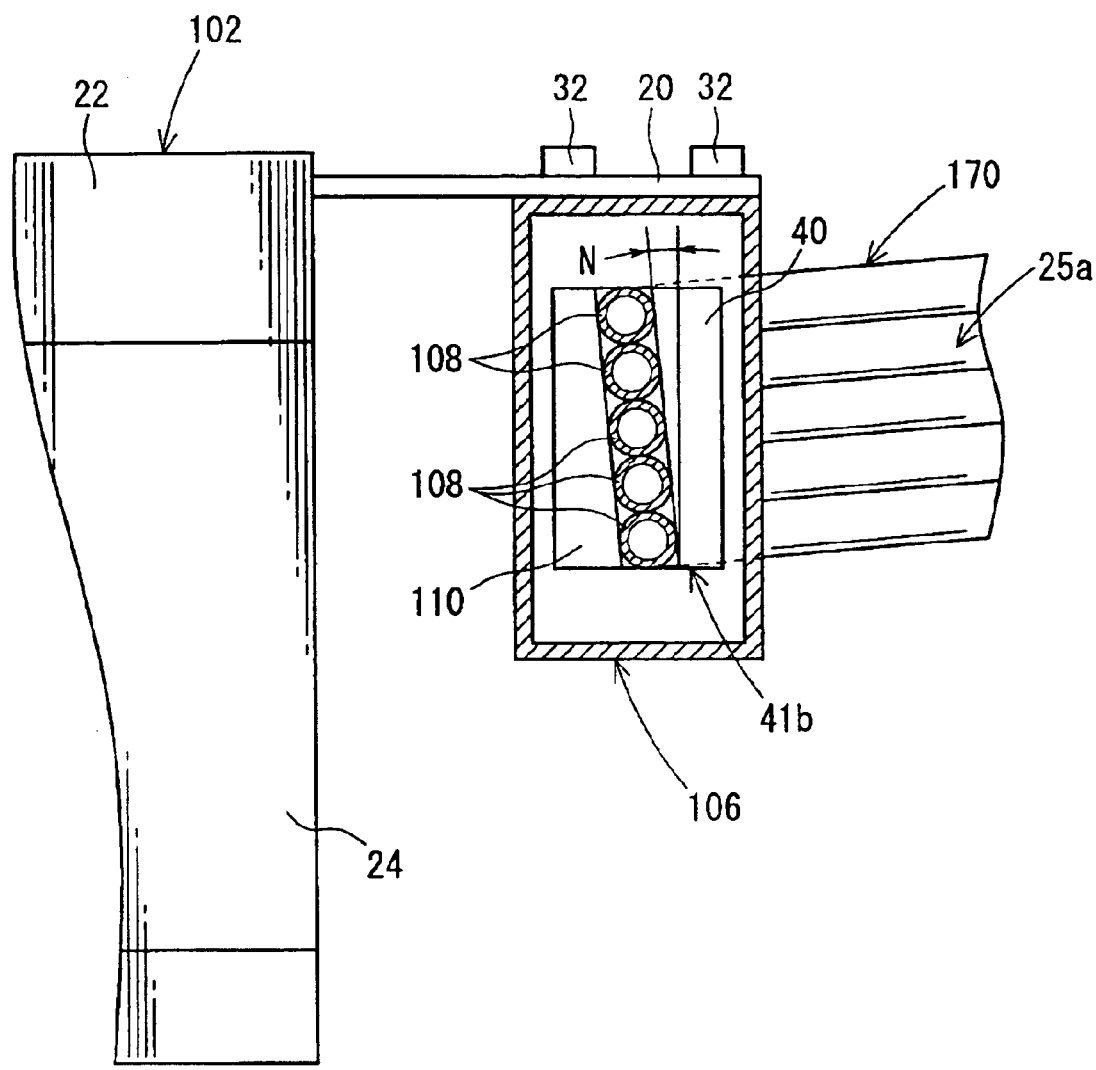
FIG. 15 is, with partial omission, a vertical sectional view illustrating the second cable-connecting section shown in FIG. 14.

Even in such a case, as shown in FIG. 14, both ends of the belt member 25a connected to the first cable-connecting section 104 (see FIG. 9) and the second cable-connecting section 106 are fixed so that each of them is inclined by a predetermined angle N with respect to the body 22 by first and second attachment members 108, 110 provided therein as shown in FIG. 15. Accordingly, the bending moment acts on the cable 170 about the support points of the attachment section 41a (see FIG. 1) of the first cable-connecting section 104 and the attachment section 41b of the second cable-connecting section 106 in the direction in which the cable 170 is twisted toward the body 22.

Therefore, it is possible to reduce the bending of the belt member 25a in the direction of the gravity generated in the vicinity of the substantially central portion of the belt member 25a, as compared with the case in which the belt member 25a is attached substantially in parallel to the vertical direction of the body 22 (in the form indicated by two-dot chain lines in FIG. 14).

That is, the belt member 25a can be inclined upwardly by a predetermined angle M about the support points of the attachment sections 41a, 41b of the first cable-connecting section 104 and the second cable-connecting section 106. Therefore, the lower end 42 of the bending of the cable 170 in the direction of the gravity, which is generated in the vicinity of the substantially central portion of the cable 170, can be displaced upwardly. The lower end 42 of the bending of the cable 170 can be prevented from any protrusion from the lower surface 43 of the first cable-connecting section 104 and the second cable-connecting section 106.

The cable 170 is not bent to protrude downwardly from the lower surface of the electric actuator 102. Therefore, the cable 170 does not contact, for example, the floor and another apparatus installed under the electric actuator 102. It is possible to avoid any resistance when the cable 170 is displaced.

The cable 170 is prevented from the deterioration of durability, because the cable 170 does not contact, for example, the floor and another apparatus (for example, the electric actuator 14) installed under the electric actuator 102.

It is possible to reduce the bending amount of the cable 170 in the direction of the gravity. Therefore, it is possible to reduce the installation space in the vertical direction of the apparatus such as the electric actuator 102 to which the cable 170 is applied, and it is possible to save the space.

Figure 16:
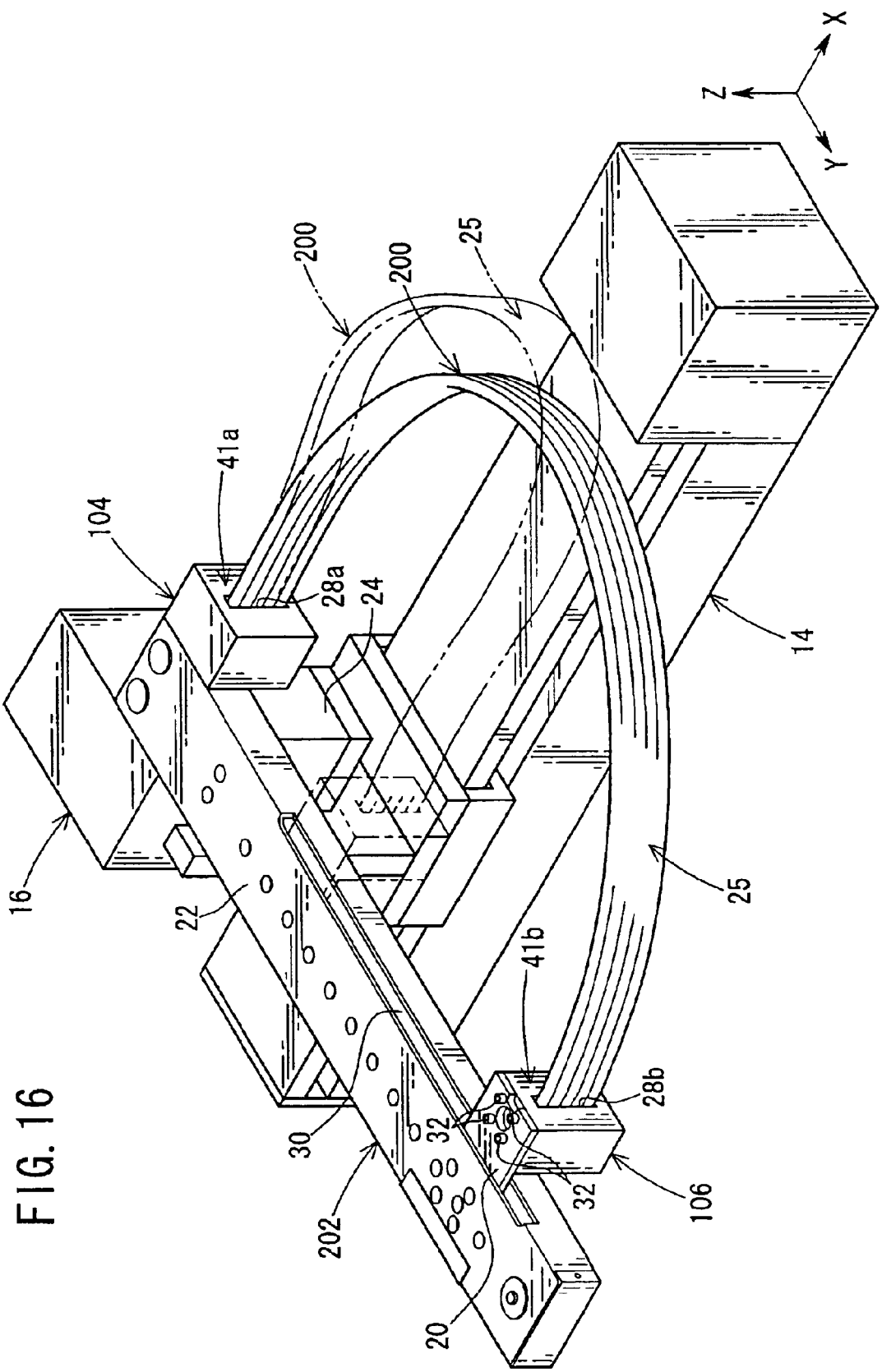
FIG. 16 is a perspective view illustrating an electric actuator to which a cable according to a fourth embodiment of the present invention is applied.
Figure 17:
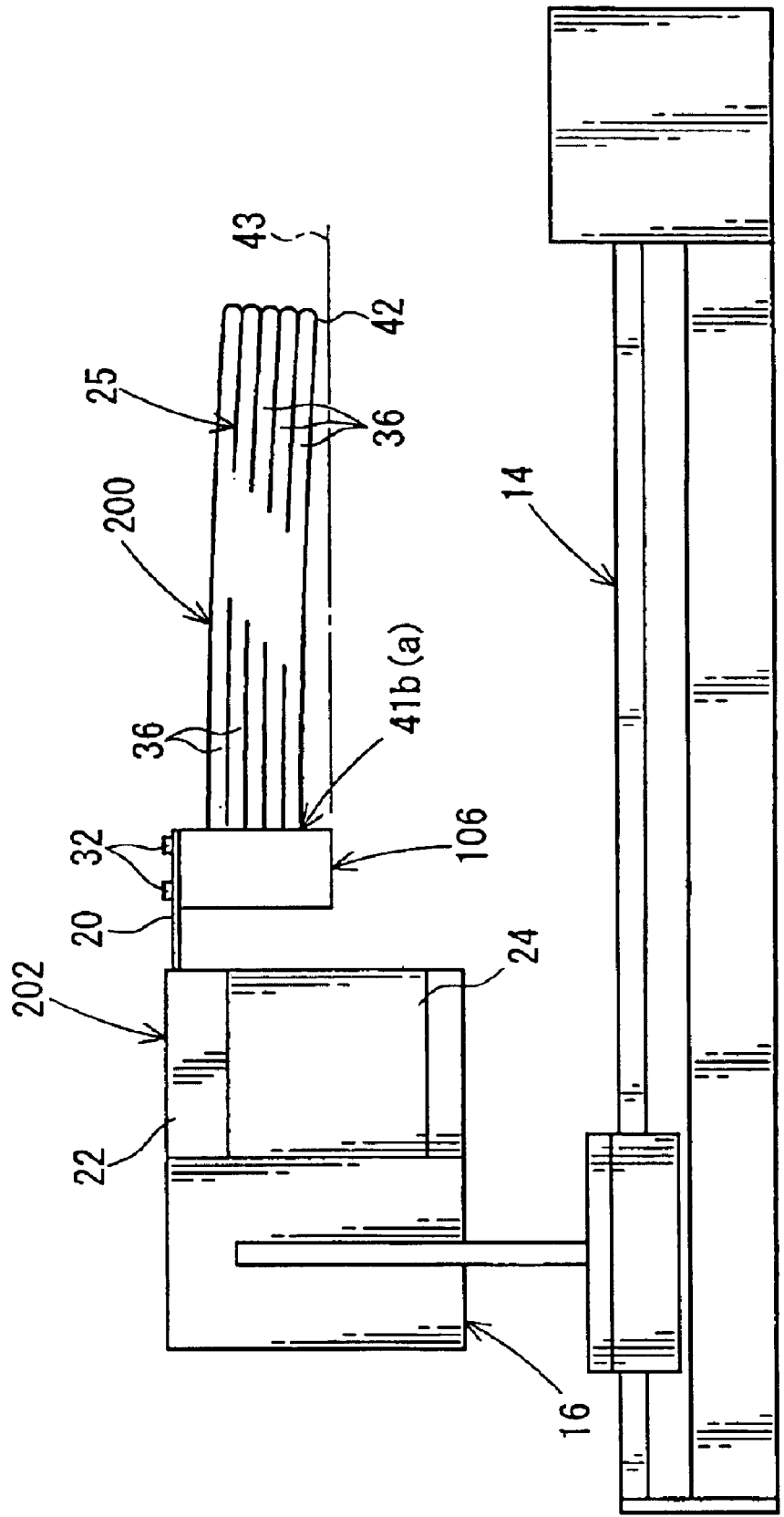
FIG. 17 is, with partial omission, a side view illustrating the electric actuator shown in FIG. 16.
Figure 18:
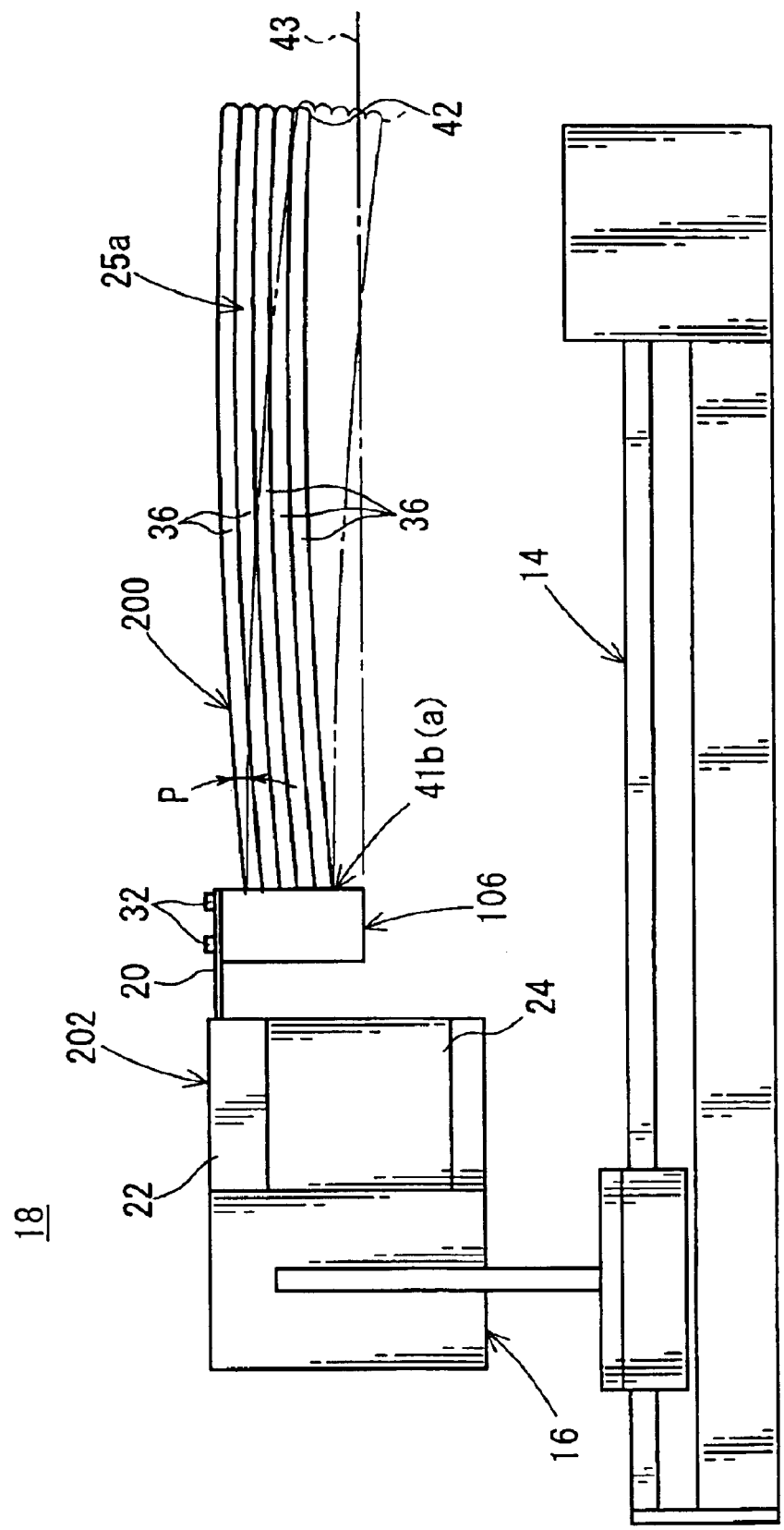
FIG. 18 is, with partial omission, a side view in which the cable shown in FIG. 16 is fixed at an angle of attachment P.

Next, an electric actuator 202, to which a cable 200 according to a fourth embodiment is applied, is shown in FIGS. 16 to 18.

The cable 200 according to the fourth embodiment is different from the cable 150 according to the third embodiment in that one and the other ends of the belt member 25 are attached to the body 22 and the slider 20 in the direction substantially perpendicular to the axis of the body 22 (see FIG. 17).

When both ends of the belt member 25 are attached in the direction substantially perpendicular to the axis of the body 22 as described above, the intermediate portion of the belt member 25, which is disposed between the body 22 and the slider 20, is retained in the space between the insertion hole 28a of the first cable-connecting section 104 and the insertion hole 28b of the second cable-connecting section 106. Therefore, it is possible to reduce the amount of outward protrusion of the belt member 25 from both ends in the axial direction of the body 22 as compared with the cable 150 according to the third embodiment (see FIG. 12).

On the other hand, for example, when a belt member 25a, which is longer than the belt member 25 by a predetermined length, is attached to the body 22 and the slider 20 so that the belt member 25a is substantially horizontal, the rigidity is insufficient in the vertical direction because the belt member 25a is long. For this reason, the bending amount of the cable 200 is increased in the direction of the gravity. The lower end 42 of the bending of the cable 200 in the direction of the gravity may protrude downwardly from the lower surface 43 of each of the first and second cable-connecting sections 104, 106 (in the form indicated by two-dot chain lines in FIG. 18).

Even in this case, as shown in FIG. 18, the cable 200 is installed to the attachment sections 41a, 41b of the first cable-connecting section 104 and the second cable-connecting section 106 so that the cable 200 is inclined upwardly by a predetermined angle P. Accordingly, the bending moment acts on the belt member 25a about the support points of the attachment sections 41a, 41b in the direction in which the belt member 25a is twisted toward the body 22. As a result, it is possible to reduce the bending of the belt member 25a in the direction of the gravity generated in the vicinity of the substantially central portion of the belt member 25a, as compared with the case in which the belt member 25 is attached to the attachment sections 41a, 41b substantially horizontally (see FIG. 17).

Accordingly, the cable 200 can be prevented from some protrusion from the lower surface 43 of each of the first and second cable-connecting sections 104, 106 of the electric actuator 202.

Figure 19:
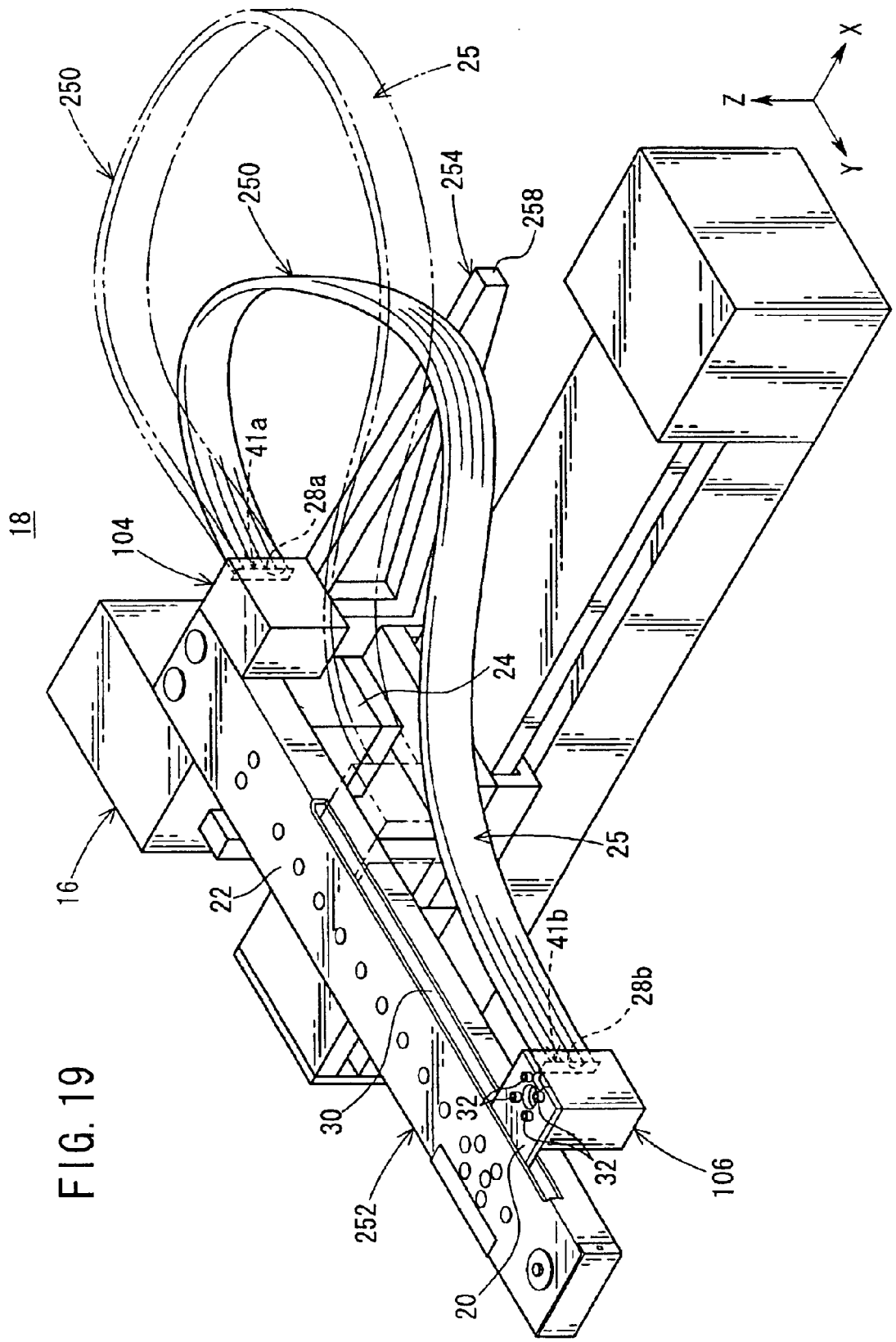
FIG. 19 is a perspective view illustrating an electric actuator to which a cable according to a fifth embodiment of the present invention is applied.
Figure 20:
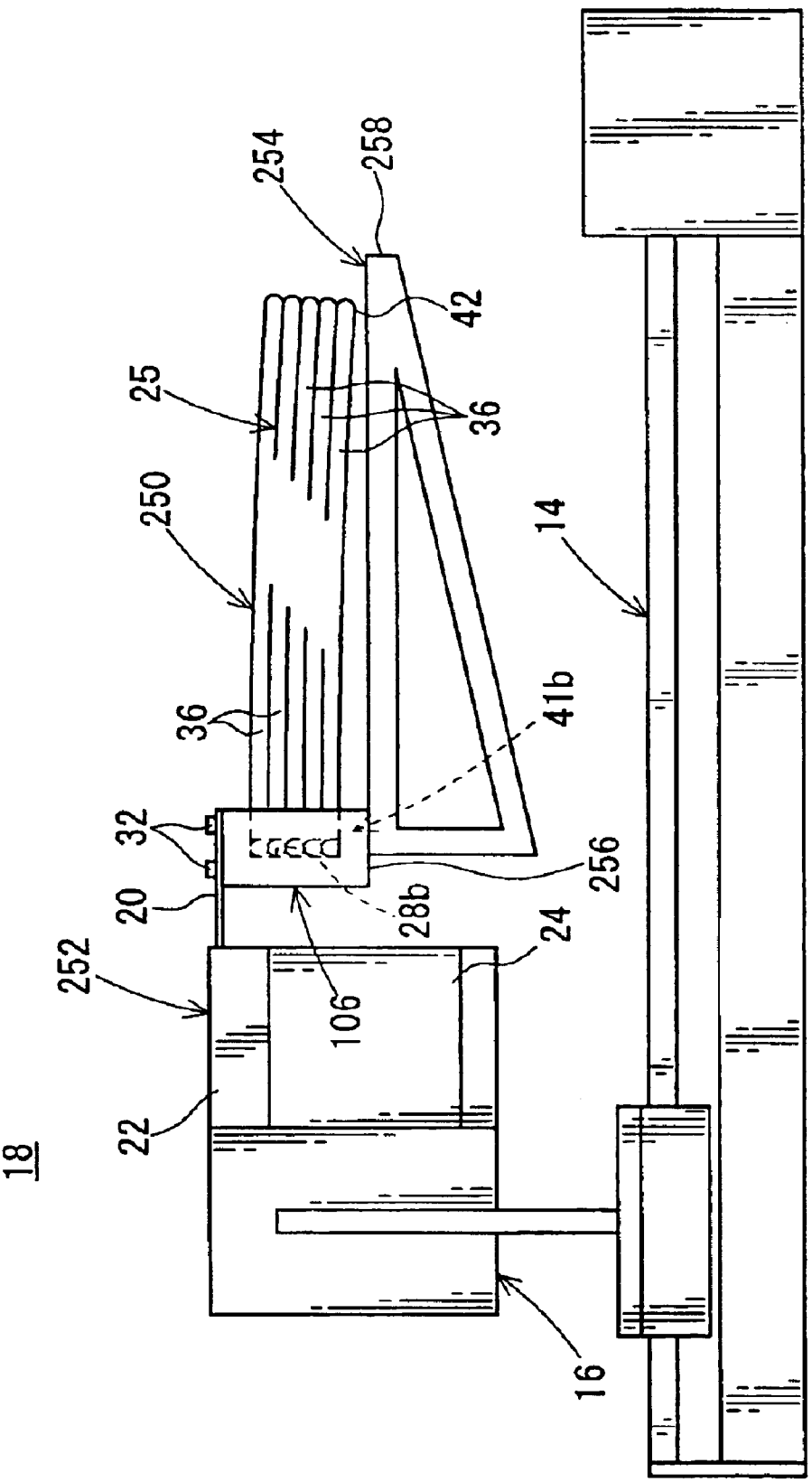
FIG. 20 is, with partial omission, a side view illustrating the electric actuator shown in FIG. 19.

Next, an electric actuator 252, to which a cable 250 according to a fifth embodiment is applied, is shown in FIGS. 19 and 20.

The cable 250 according to the fifth embodiment is different from the cable 10 according to the first embodiment in that a guide mechanism 254 is provided for supporting the lower surface of the belt member 25 when the belt member 25 is flexed in accordance with the displacement of the slider 20.

As shown in FIG. 20, the guide mechanism 254, which reduces the bending of the belt member 25 in the direction of the gravity, is provided at a position to support the lower surface of the belt member 25. The guide mechanism 254 is a substantially triangular guide bar (guide member) 258. The guide mechanism 254 is provided so that the upper surface of the guide bar 258 is substantially flush with the lower surface 256 of the first cable-connecting section 104.

As a result, when the belt member 25 is flexed and displaced about the support point of one end installed to the body 22 by the displacement of the slider 20, the lower surface of the belt member 25 is appropriately retained by the upper surface of the guide bar 258. Accordingly, the belt member 25 is prevented from being bent downwardly from the upper surface of the guide bar 258.

That is, the belt member 25 is retained by the upper surface of the guide bar 258. Accordingly, the lower end 42 of the bending of the belt member 25 in the direction of the gravity is prevented from any downward protrusion from the lower surface 256 of the first cable-connecting section 104 of the electric actuator 252.

Figure 21:
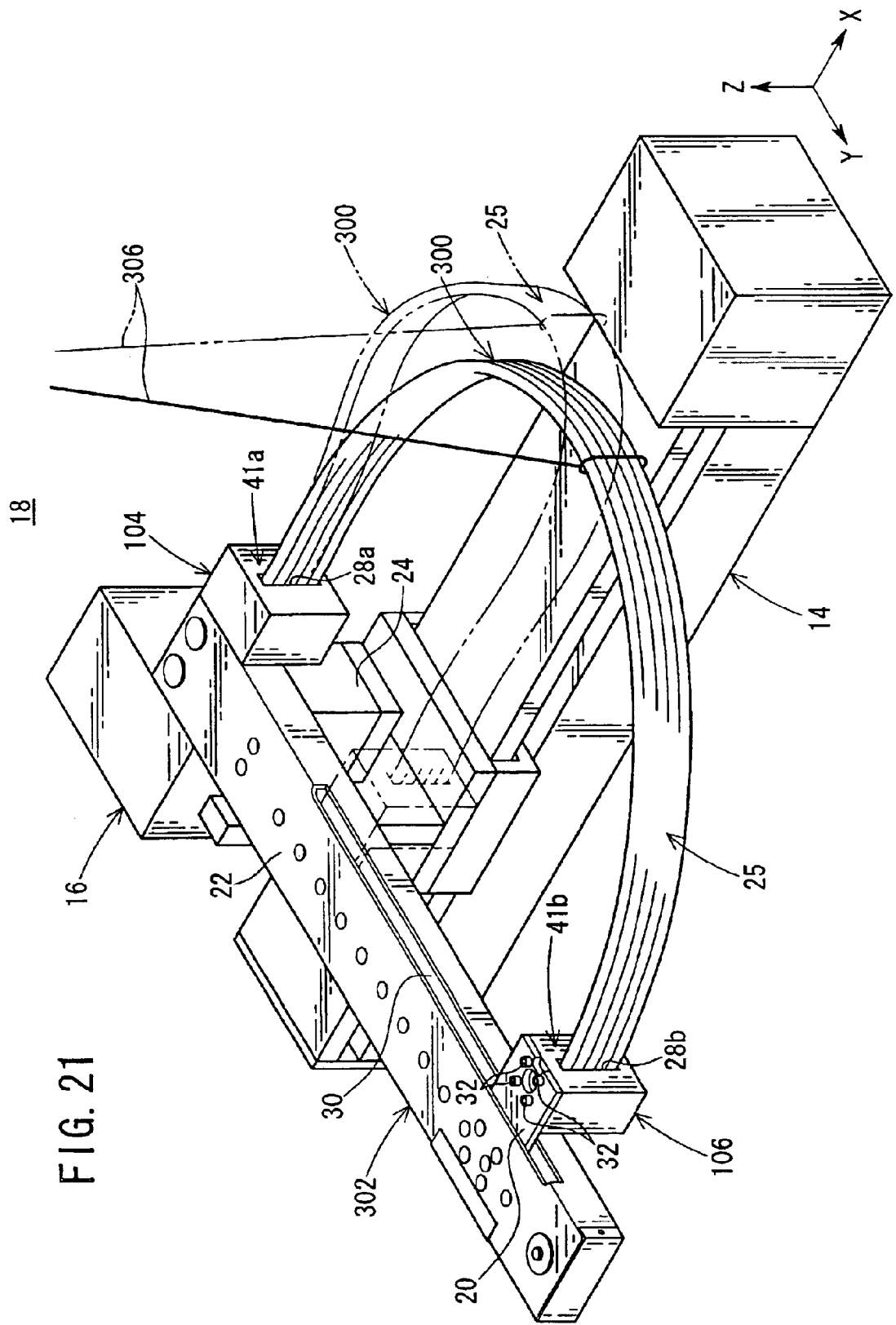
FIG. 21 is a perspective view of an electric actuator to which a cable according to a sixth embodiment of the present invention is applied.
Figure 22:
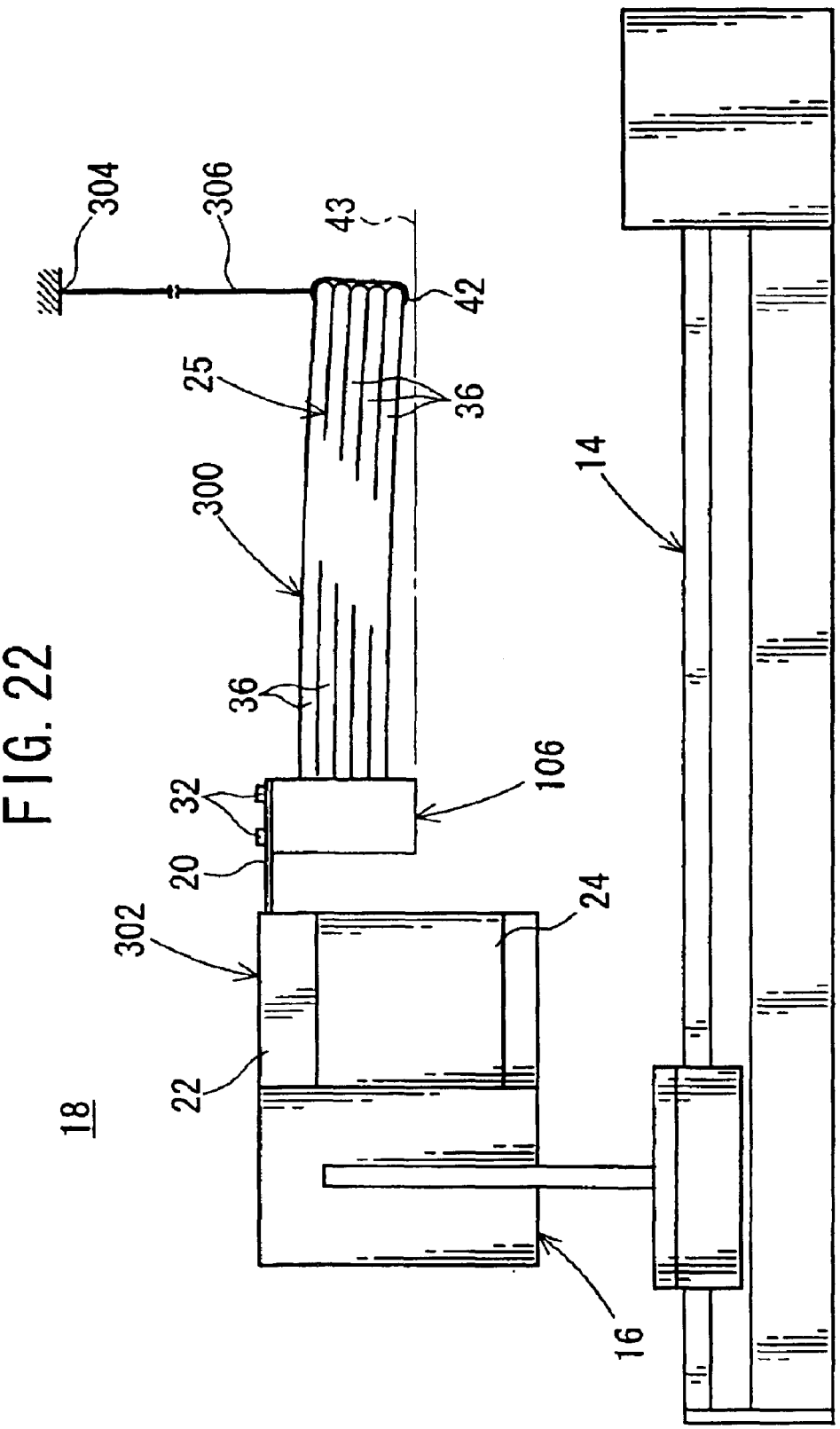
FIG. 22 is, with partial omission, a side view illustrating the electric actuator shown in FIG. 21.
Figure 23:
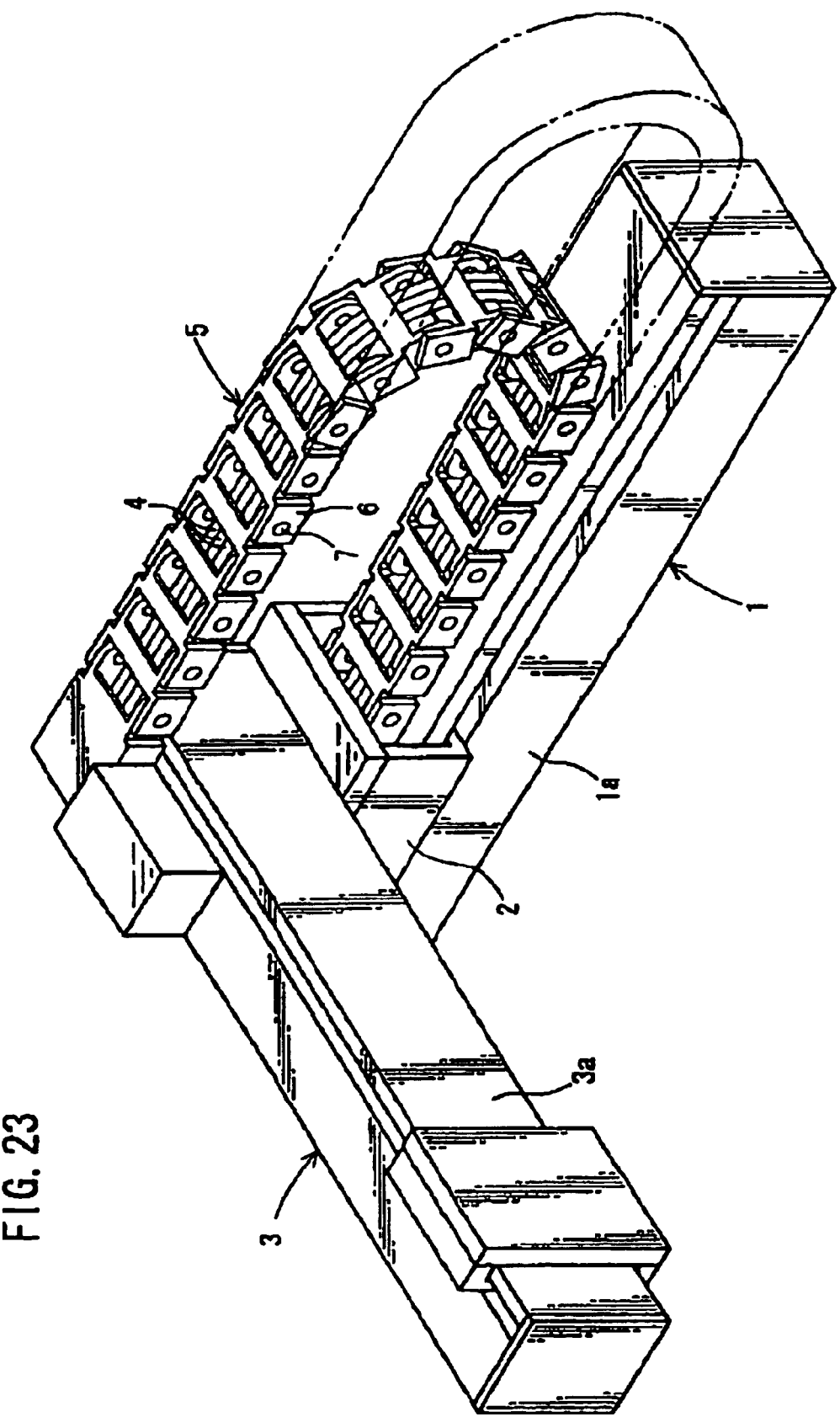
FIG. 23 is a perspective view illustrating an actuator to which a conventional cable is applied.

Next, an electric actuator 302, to which a cable 300 according to a sixth embodiment is applied, is shown in FIGS. 21 and 22.

The cable 300 according to the sixth embodiment is different from the cable 10 according to the first embodiment in that the downward bending of the cable 300 is reduced by hanging a substantially central portion of the belt member 25 by a hanging member 306 such as a wire which is connected to the ceiling 304 or the like (see FIG. 22).

As shown in FIG. 22, the substantially central portion of the belt member 25 is hung by the hanging member 306 having one end which is connected to the ceiling 304 or the position higher than the cable 300. The cable 300 is hung by the hanging member 306 so that the cable 300 is substantially horizontal with respect to the attachment sections 41a, 41b (see FIG. 21) of the first cable-connecting section 104 and the second cable-connecting section 106. The length of the hanging member 306 is somewhat long with a margin so that no resistance arises when the cable 300 is flexed by the displacement of the slider 20.

As a result, the substantially central portion of the belt member 25 is always hung by the hanging member 306 so that the belt member 25 is substantially horizontal with respect to the body 22. Accordingly, the cable 300 is prevented from some downward bending, and the cable 300 is prevented from some downward protrusion from the lower surface 43 of the electric actuator 302. The bending amount of the cable 300 can be adjusted by arbitrarily setting the length and the number of the hanging member or hanging members 306 and the position of the ceiling 304 or the like for hanging one end of the hanging member 306.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A cable structure comprising:

a fixed end fixed to an actuator body;

a movable end attached to a displaceable member which is displaceable in an axial direction of said actuator body; and a belt member provided between said fixed end and said movable end, said belt member being connected to a rotatable member which is rotatably supported on said fixed end, wherein when said displaceable member and said movable end displace integrally, said rotatable member disposed at said fixed end, to which an end of said belt member is connected, is rotated and an axis of said belt member is flexible on a horizontal plane.

2. The cable structure according to claim 1, wherein said rotatable member at said fixed end is provided with a driving source for driving and rotating said rotatable member, and said rotatable member is rotated by said driving source depending on bending of said belt member.

3. The cable structure according to claim 1, wherein a side surface of said belt member in a widthwise direction, which is perpendicular to said axis of said belt member, is parallel to a vertical plane.

4. The cable structure according to claim 3, wherein a dimension of said belt member in width is larger than a dimension of said belt member in thickness.

5. The cable structure according to claim 1, wherein said belt member comprises tubes which are juxtaposed in an axial direction of said belt member and which have passages formed therein.

6. A cable structure comprising:

a fixed end fixed to an actuator body;

a movable end attached to a displaceable member which is displaceable in an axial direction of said actuator body; and a belt member provided between said fixed end and said movable end, with ends of said belt member being attached to said fixed end and said movable end, at least one of said ends of said belt member being inclined by a predetermined angle toward said actuator body on a horizontal plane, wherein said predetermined angle is a non-zero angle that exists between a tangent of a central curve of said belt member, at a point where said central curve intersects an attachment surface of a cable-connecting section, and a line that is normal to said attachment surface and parallel to said axial direction of said actuator body, and wherein an axis of said belt member is flexible on said horizontal plane when said displaceable member and said movable end are displaced integrally.

7. The cable structure according to claim 6, wherein a side surface of said belt member in a widthwise direction, which is perpendicular to said axis of said belt member, is parallel to a vertical plane.

8. The cable structure according to claim 7, wherein a dimension of said belt member in width is larger than a dimension of said belt member in thickness.

9. The cable structure according to claim 6, wherein said belt member comprises tubes which are juxtaposed in an axial direction of said belt member and which have passages formed therein.

10. The cable structure according to claim 6, further comprising a bending-reducing mechanism for reducing bending at an intermediate portion of said belt member caused by a weight of said belt member, wherein said belt member has attachment sections to be connected to said fixed end and said movable end.

11. The cable structure according to claim 10, wherein said bending-reducing mechanism comprises a guide mechanism which is provided for said actuator body and which retains a lower surface of said intermediate portion of said belt member against bending by said weight of said belt member.

12. The cable structure according to claim 11, wherein said guide mechanism comprises a guide member which has a plane flush with a lower surface of said fixed end.

13. The cable structure according to claim 10, wherein said bending-reducing mechanism comprises a hanging member for hanging said intermediate portion between said fixed end and said movable end of said belt member.

* * * * *